(12) United States Patent
Besecker et al.

(10) Patent No.: US 10,600,255 B2
(45) Date of Patent: Mar. 24, 2020

(54) TECHNOLOGIES FOR COMPOSING A VIRTUAL REALITY SETTING IN A MOBILE COMPUTING ENVIRONMENT

(71) Applicant: Marxent Labs, LLC, Miamisburg, OH (US)

(72) Inventors: Bret Besecker, Safety Harbor, FL (US); Barry Besecker, Xenia, OH (US); Ken Moser, Springboro, OH (US)

(73) Assignee: Marxent Labs, LLC, Miamisburg, OH (US)

(*) Notice: Subject to any disclaimer, the term of this patent is extended or adjusted under 35 U.S.C. 154(b) by 0 days.

(21) Appl. No.: 16/180,733

(22) Filed: Nov. 5, 2018

(65) Prior Publication Data
US 2019/0139322 A1     May 9, 2019

Related U.S. Application Data

(60) Provisional application No. 62/581,479, filed on Nov. 3, 2017.

(51) Int. Cl.
*G06T 19/20*     (2011.01)
*G06Q 10/08*     (2012.01)
(Continued)

(52) U.S. Cl.
CPC .......... *G06T 19/20* (2013.01); *G06Q 10/087* (2013.01); *G06Q 30/0207* (2013.01);
(Continued)

(58) Field of Classification Search
CPC . G06T 19/20; G06T 11/60; G06T 2219/2021; G06T 2219/2004;
(Continued)

(56) References Cited

U.S. PATENT DOCUMENTS

| 7,643,692 B2 | 1/2010 | Dittlo et al. |
| 9,818,228 B2 | 11/2017 | Lanier |

(Continued)

FOREIGN PATENT DOCUMENTS

| EP | 1732042 | 12/2006 |
| EP | 2317478 | 5/2011 |

OTHER PUBLICATIONS

Merrell et al., "Interactive Furniture Layout Using Interior Design Guidelines," ACM Transactions on Graphics, Jul. 2011, 30(4), 9 pages.

(Continued)

*Primary Examiner* — Robert J Craddock
(74) *Attorney, Agent, or Firm* — Ice Miller, LLP

(57) ABSTRACT

Technologies for composing a virtual reality setting on a mobile computing device are disclosed. In one or more techniques, a virtual reality environment may be configured on the mobile computing device. At least one virtual item may be selected for addition to the virtual reality environment. Information may be determined regarding a fit, a location, and/or a compatibility of the at least one virtual item relative to the virtual reality environment. The at least one virtual item may be added to the virtual reality environment based, at least in part, in the information. The virtual reality environment may be rendered on a display of the mobile computing device. The information may comprise rules regarding the at least one virtual item, or metadata corresponding to the at least one virtual item. The rules and/or the metadata may be predetermined, or may be determined by the mobile computing device at run time.

22 Claims, 27 Drawing Sheets

(51) Int. Cl.
  *G06Q 30/02* (2012.01)
  *G06Q 30/06* (2012.01)
  *G06T 11/60* (2006.01)

(52) U.S. Cl.
  CPC ..... *G06Q 30/0241* (2013.01); *G06Q 30/0643* (2013.01); *G06T 11/60* (2013.01); *G06T 2200/24* (2013.01); *G06T 2210/04* (2013.01); *G06T 2219/2004* (2013.01); *G06T 2219/2021* (2013.01)

(58) Field of Classification Search
  CPC ............ G06T 2210/04; G06T 2200/24; G06Q 30/0241; G06Q 30/0207; G06Q 10/087; G06Q 30/0643
  See application file for complete search history.

(56) References Cited

U.S. PATENT DOCUMENTS

| | | | |
|---|---|---|---|
| 10,083,542 B1* | 9/2018 | Murao | G06T 17/00 |
| 10,223,740 B1* | 3/2019 | Gore | G06Q 10/10 |
| 2012/0249544 A1* | 10/2012 | Maciocci | G06F 3/011 |
| | | | 345/419 |
| 2014/0152558 A1 | 6/2014 | Salter | |
| 2017/0336863 A1* | 11/2017 | Tilton | G06F 3/012 |

OTHER PUBLICATIONS

Orr, "Area Macy's Store Adds Virtual reality Technology," https://www.ibj.com/blogs/19-property-lines/post/71071-area-macys-store-adds-virtual-reality-technology?utm_source=ibj-daily&utm_medium=newsletter&utm_campaign=2018-10-26, Oct. 26, 2018, 4 pages.
International Patent Application No. PCT/US2018/059208, Notification of Transmittal of the International Search Report and the Written Opinion of the International Searching Authority, or the Declaration, dated Apr. 3, 2019, 10 pages.
International Patent Application No. PCT/US2018/062578, Notification of Transmittal of the International Search Report and the Written Opinion of the International Searching Authority, or the Declaration, dated Mar. 11, 2019, 10 pages.

* cited by examiner

TECHNOLOGIES FOR COMPOSING A VIRTUAL REALITY SETTING IN A MOBILE COMPUTING ENVIRONMENT

CROSS-REFERENCE TO RELATED APPLICATIONS

This application claims the benefit of U.S. Provisional Patent Application No. 62/581,479, filed on Nov. 3, 2017, the contents of which being incorporated by reference herein in its entirety, for all purposes.

BACKGROUND

Rendering images refers to a series of calculations that are performed to generate a two-dimensional (2D) image from a 2D or three-dimensional (3D) model using a computer program (e.g., a rendering engine). In other words, the 2D or 3D models represent a mathematical representation of points and surfaces (e.g., vertices and polygons) in the respective virtual environment that the rendering engine can translate into a 2D image. Such rendering can be performed in real-time (e.g., real-time rendering) or ahead of time (e.g., pre-rendering). While pre-rendering is typically used for creating movies, real-time rendering is often used for rendering scenes in video games, or augmented reality or virtual reality settings.

SUMMARY

In one or more techniques, a virtual reality environment may be configured on the mobile computing device. At least one virtual item may be selected for addition to the virtual reality environment. Information may be determined regarding a fit, a location, and/or a compatibility of the at least one virtual item relative to the virtual reality environment. The at least one virtual item may be added to the virtual reality environment based, at least in part, in the information. The virtual reality environment may be rendered on a display of the mobile computing device. The information may comprise rules regarding the at least one virtual item, or metadata corresponding to the at least one virtual item. The rules and/or the metadata may be predetermined, or may be determined by the mobile computing device at run time.

In one or more techniques, the metadata corresponding to the at least one virtual item, and/or the one or more rules regarding the at least one virtual item may be obtained by the mobile computing device at run time.

In one or more techniques, the metadata corresponding to the at least one virtual item, and/or the one or more rules regarding the at least one virtual item may be received from a database. The database may be stored in a memory of the mobile computing device, and/or located at a remote computing device in communication with the mobile computing device.

In one or more techniques, the at least one virtual item may be a virtual object, and/or a virtual assembly. A virtual object may be a cabinet, a refrigerator, a sofa, a floor, a table, a dishwasher, a faucet, a vanity, and/or a lamp. A virtual assembly may be a plurality of kitchen cabinets, a faucet mounted on a vanity, and/or a lamp on a table.

In one or more techniques, configuring the virtual reality environment may include capturing an image via a camera of the mobile computing device. Configuring the virtual reality environment may include analyzing the captured image, and/or rendering the analyzed captured image into at least a part of the virtual reality environment.

In one or more techniques, configuring the virtual reality environment may include obtaining a two-dimensional (2D) model and/or a three-dimensional (3D) model. Configuring the virtual reality environment may include rendering the 2D model and/or the 3D model into at least a part of the virtual reality environment.

In one or more techniques, the 2D model and/or the 3D model may be received from a database. The database may be stored in a memory of the mobile computing device, and/or located at a remote computing device in communication with the mobile computing device.

In one or more techniques, the one or more rules regarding the at least one virtual item, and/or the metadata corresponding to the at least one virtual item may correspond, at least in part, to a virtual object class.

In one or more techniques, the at least one virtual item may be a first virtual object of a first virtual object class. The one or more rules regarding the at least one virtual item, and/or the metadata corresponding to the at least one virtual item may control the adding of the first virtual object to the virtual reality environment such that the first virtual object is to be in virtual contact with a second virtual object of the first virtual object class.

In one or more techniques, the at least one virtual item is may be a first virtual object. The one or more rules regarding the at least one virtual item, and/or the metadata corresponding to the at least one virtual item may control the adding of the first virtual object to the virtual reality environment such that the first virtual object is to be in virtual contact with a second virtual object according to one or more merchandising characteristics. The one or more merchandising characteristics may include a sale discount for the second virtual object, a manufacturer's rebate for the second virtual object, a warranty of use of the second virtual object in combination with the first virtual object, and/or a physical interconnection capability between the first virtual object and the second virtual object.

In one or more techniques, the one or more rules regarding the at least one virtual item, and/or the metadata corresponding to the at least one virtual item may control the adding of the first virtual object to the virtual reality environment such that the first virtual object is to be in virtual contact with one or more specific other virtual objects.

BRIEF DESCRIPTION OF DRAWINGS

The devices, systems, methods, and other features, advantages and disclosures contained herein, and the manner of attaining them, will become apparent and the present disclosure will be better understood by reference to the following description of various example techniques of the present disclosure taken in conjunction with the accompanying drawings, wherein.

DETAILED DESCRIPTION

Figure 1:
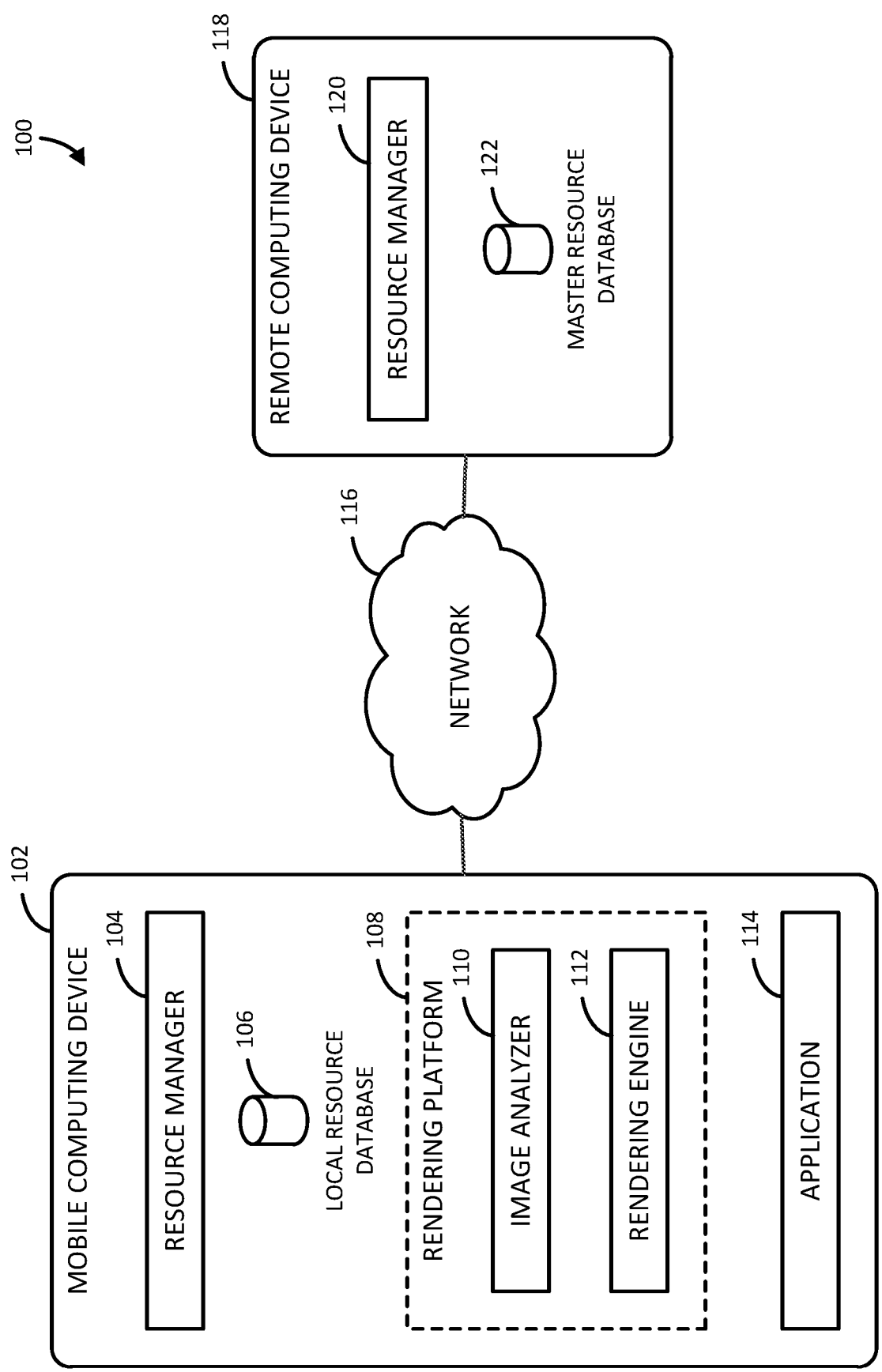
FIG. 1 is a block diagram of at least one example of a system for composing a virtual reality setting in a mobile computing environment.

For the purposes of promoting an understanding of the principles of the present disclosure, reference will now be made to the examples illustrated in the drawings and the description of same. It will nevertheless be understood that no limitation of the scope of this disclosure is thereby intended.

Perhaps due to the form factor size limitations of mobile computing devices (e.g., smartphones, tablets, etc.), they cannot often support such robust dedicated graphics hardware as non-mobile computing devices (e.g., desktops, servers, etc.). As such, rendering such virtual objects for use in mobile applications can oftentimes appear choppy and can require excessive overhead and/or bandwidth to interface with a remote rendering engine.

Moreover, the computing and networking infrastructure within which an augmented reality and/or virtual reality application may be deployed often is not conducive to efficient deployment of the augmented reality and/or virtual reality applications. Low bandwidth networks might not handle an augmented reality application and/or a virtual reality application without significant performance degradation. Accordingly, improvements in technologies for composing a virtual reality setting and/or rendering virtual reality objects in a mobile computing environment may be useful.

For example, it may be useful and/or an improvement over current or prior art methods to provide one or more techniques to narrow down features and/or objects, selectable from a dynamically expandable database, that may be added to a virtual reality environment. The addition of features/objects may be based on one or more dynamically updated rules and/or metadata corresponding to the features/objects relative to the virtual reality environment.

FIG. 1 is an illustrative system 100 for composing a virtual reality setting in a mobile computing environment that includes a mobile computing device 102 and a remote computing device 118 communicatively coupled via a network 120. The illustrative mobile computing device 102 includes an resource manager 104 and an application 114. The application 114 of the mobile computing device 102 interfaces with a user (e.g., via a touchscreen display) to compose a virtual reality setting, the virtual reality setting comprising a virtual environment and/or virtual objects (e.g., 3D models) rendered in the virtual environment. The application 114 may be embodied as any combination of hardware, firmware, software, and/or circuitry usable to perform the functions described herein. To do so, the illustrative mobile computing device 102 also may capture a series of images using a camera (see, e.g., the camera sensor 214 of FIG. 2) of the mobile computing device 102.

For one or more, or each, captured image, the mobile computing device 102 may be configured to determine at least one position within the image at which to render one or more, or each, 3D model relative to the environment captured by the image. The mobile computing device 102 (e.g., via image analyzer 110) may be configured to extract relevant feature data from the image (e.g., resolution, field of view (FOV), focal length, imaging center, etc.), as well as to measure (see, e.g., the IMU sensor 216) information usable to track movement of the mobile computing device 102 relative to the environment, such as position/orientation data.

In use, a user of the mobile computing device 102 defines a three dimensional virtual environment via a touchscreen display 210 of the mobile computing device 102. The user of mobile computing device 102 then selects and/or places one or more 3D models relative to the virtual environment (e.g., via a touchscreen display 210 of the mobile computing device 102). For example, the user may design and/or configure a virtual environment comprising a virtual living space. For example, the user then, for example, may input a stock keeping unit (SKU) and/or other identifier associated with a physical object for which the application 114 has a corresponding 3D model, and/or may select a 3D model of a physical object from a list of 3D models. The user may select an initial position and/or orientation of the selected 3D model relative to the virtual environment captured by the mobile computing device 102. The SKU and/or other identifier may reference a (e.g., single) 3D model (e.g., a piece of furniture) and/or more than one 3D model (e.g., a set of furniture). In other words, more than one 3D model can be selected for rendering in the virtual environment at any given time. In one or more techniques, for example in which more than one 3D model may be referenced, one or more, or each, 3D model may be considered an individual 3D model and/or positioned/orientated as an individual 3D model relative to the other 3D models, and/or may be treated as a group of 3D models positioned/oriented together.

Subsequent to the selection of the 3D model(s) to be rendered, the mobile computing device 102 may be configured to determine where the 3D model(s) to be rendered are stored, e.g., in local resource database 106 and/or master resource database 122. One or more, or each, 3D model may be packaged into a binary resource that includes its rendering components, as well as any physics information, audio information, rules, metadata, and/or any other overhead. Some or all contents of the local resource database 106 and/or the master resource database 122 may be updated and/or expanded continuously in real time, periodically, and/or on demand, for example via an Internet-based cloud connection, and/or the like.

The mobile computing device 102 may be embodied as any type of camera-equipped portable computing device capable of performing the functions described herein. Specifically, the mobile computing device 102 may be embodied as any type of camera-equipped portable computing device that uses mobile-specific hardware and/or software components for operating and/or executing on a mobile architecture. Illustrative examples of such mobile computing device 102 may include, but are not limited to, smartphones, wearables (e.g., smartwatches, smart glasses, etc.), tablets, laptops, etc. Accordingly, the mobile computing device 102 may include any type of firmware, hardware, software, circuitry, and/or combination thereof capable of performing the functions described herein.

Figure 2:
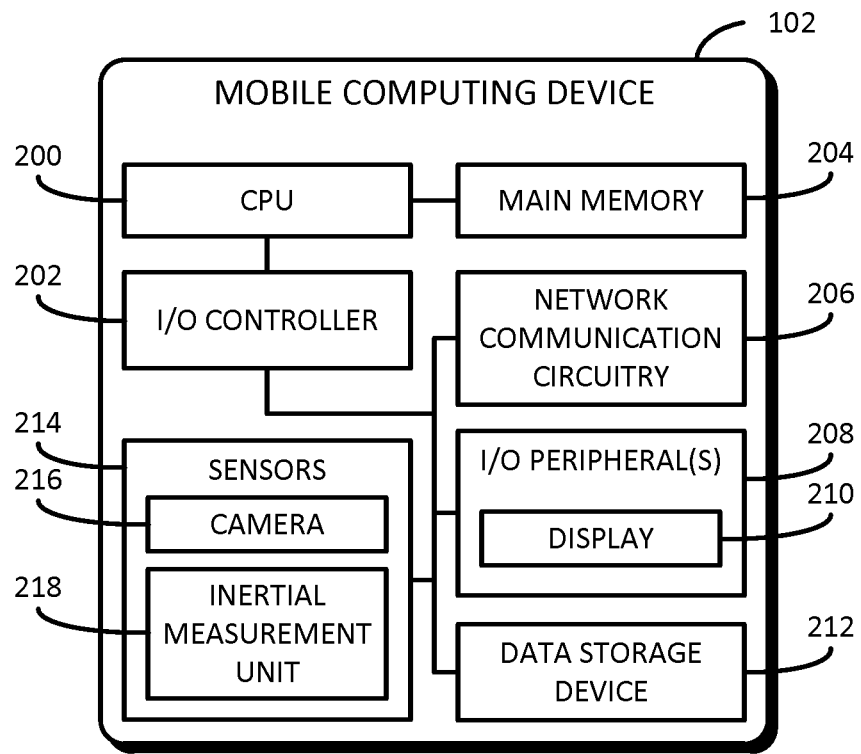
FIG. 2 is a block diagram of at least one example of a mobile computing device for composing a virtual reality setting in a mobile computing environment.

Referring now to FIG. 2, the illustrative mobile computing device 102 includes a central processing unit (CPU) 200, an input/output (I/O) controller 202, a memory 204, network communication circuitry 206, one or more I/O peripherals 208, a data storage device 212, and/or various sensors 214. In some scenarios, there may be additional, fewer, and/or alternative components to those of the illustrative mobile computing device 102, such as a graphics processing unit (GPU). In some scenarios, one or more components may be combined on a single system-on-a-chip (SoC) on a single integrated circuit (IC). In some scenarios, the type of components of the respective mobile computing device 102 may be predicated upon the type and/or intended use of the respective mobile computing device 102.

The CPU 200, or processor, may be embodied as any combination of hardware and/or circuitry capable of processing data. In some scenarios, the mobile computing device 102 may include more than one CPU 200. Perhaps depending on the scenario, the CPU 200 may include one processing core (not shown), such as in a single-core processor architecture, or multiple processing cores, such as in a multi-core processor architecture. Irrespective of the number of processing cores and/or CPUs 200, the CPU 200 is capable of reading and/or executing program instructions. In some scenarios, the CPU 200 may include cache memory (not shown) that may be integrated directly with the CPU 200 or placed on a separate chip with a separate interconnect to the CPU 200. In some scenarios, pipeline logic may be used to perform software and/or hardware operations (e.g., network traffic processing operations), rather than commands issued to/from the CPU 200.

The I/O controller 202, or I/O interface, may be embodied as any type of computer hardware and/or combination of circuitry capable of interfacing between input/output devices and/or the mobile computing device 102. Illustratively, the I/O controller 202 may be configured to receive input/output requests from the CPU 200, and/or send control signals to the respective input/output devices, thereby managing the data flow to/from the mobile computing device 102.

The memory 204 may be embodied as any type of computer hardware and/or combination of circuitry capable of holding data and/or instructions for processing. Such memory 204 may be referred to as main or primary memory. In some scenarios, one or more components of the mobile computing device 102 may have direct access to memory, such that certain data may be stored via direct memory access (DMA) independently of the CPU 200.

The network communication circuitry 206 may be embodied as any type of computer hardware and/or combination of circuitry capable of managing network interfacing communications (e.g., messages, datagrams, packets, etc.) via wireless and/or wired communication modes. In some scenarios, the network communication circuitry 206 may include a network interface controller (NIC) capable of being configured to connect the mobile computing device 102 to a computer network, as well as other devices, perhaps for example depending on the scenario.

The one or more I/O peripherals 208 may be embodied as any auxiliary device configured to connect to and/or communicate with the mobile computing device 102. For example, the I/O peripherals 208 may include, but are not limited to, a mouse, a keyboard, a monitor, a touchscreen, a printer, a scanner, a microphone, a speaker, etc. Some I/O devices may be capable of one function (e.g., input or output), or both functions (e.g., input and/or output). The illustrative I/O peripherals 208 includes a display, which may be embodied as a touchscreen display capable of receiving user input via touch (e.g., one or more fingers, a stylus, etc.).

In some scenarios, the I/O peripherals 208 may be connected to the mobile computing device 102 via a cable (e.g., a ribbon cable, a wire, a universal serial bus (USB) cable, a high-definition multimedia interface (HDMI) cable, etc.) of the mobile computing device 102. In some scenarios, the cable may be connected to a corresponding port (not shown) of the mobile computing device 102 for which the communications made there between can be managed by the I/O controller 202. In some scenarios, the I/O peripherals 208 may be connected to the mobile computing device 102 via a wireless mode of communication (e.g., Bluetooth®, Wi-Fi®, etc.) which can be managed by the network communication circuitry 206.

The data storage device 212 may be embodied as any type of computer hardware capable of the non-volatile storage of data (e.g., semiconductor storage media, magnetic storage media, optical storage media, etc.). Such data storage devices 212 are commonly referred to as auxiliary and/or secondary storage, and/or may be used to store a large amount of data relative to the memory 204 described above.

The illustrative sensors 214 include a camera sensor 216 and/or an inertial measurement unit (IMU) sensor 218. In some scenarios, the sensors 214 may include one or more additional sensors 214. The camera sensor 216 may be embodied as an type of image sensor (e.g., complementary metal-oxide-semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, and/or any other image sensor technology that can generate digital image frames.

The IMU sensor 218 may include one or more software and/or hardware gyroscopes to measure the orientation of the mobile computing device 102 (e.g., a 3-axis gyroscope), accelerometers to measure proper acceleration of the mobile computing device 102 (e.g., a 3-axis accelerometer), magnetometers to measure the direction of the Earth's magnetic field relative to the mobile computing device 102 (e.g., a 3-axis magnetometer), and/or any other type of inertial motion measurement software/hardware usable to perform the functions described herein (e.g., measure motion along three perpendicular linear axes and/or the rotation around, one or more, or each, of the three perpendicular linear axes).

Referring again to FIG. 1, resource manager 104, which may be embodied as any type of firmware, hardware, software, circuitry, and/or combination thereof, may be configured to manage one or more 3D models stored in the local resource database 106. The resource manager 104 may be configured to retrieve the one or more 3D models from the local resource database 106 and/or transmit them to the application 114, perhaps for example upon receiving a request from the application 114 that includes identifying information for one or more, or each, object of which a 3D model is to be rendered. The resource manager 104 may also configured to retrieve additional 3D models from the remote computing device 118, and/or more particularly the resource manager 120 of the remote computing device 118. The resource manager 120 can retrieve the requested one or more 3D models from a master resource database 122 of the remote computing device and/or return them to the resource manager 104 via network 116.

The rendering platform 108 may be embodied as any combination of hardware, firmware, software, and/or circuitry usable to perform the functions described herein. The illustrative rendering platform 108 includes an image analyzer 110 and/or a rendering engine 112, one or more, or each, of which may be embodied as any type of firmware, hardware, software, circuitry, and/or combination thereof, that may be configured to perform the functions described herein. In some scenarios, the resource manager 104, the image analyzer 110, and/or the rendering engine 112 may include one or more computer-readable medium (e.g., the memory 204, the data storage device 212, and/or any other media storage device) having instructions stored thereon and/or one or more processors (e.g., the CPU 200) coupled with the one or more computer-readable medium and/or configured to execute instructions to perform the functions described herein.

The image analyzer 110, which may be embodied as any type of firmware, hardware, software, circuitry, and/or combination thereof, may be configured to analyze the captured image to determine one or more features of the images captured by the mobile computing device 104, and/or more particularly by the camera sensor(s) 216 of the mobile computing device 104. The image analyzer 110 may be configured to generate a virtual image and/or virtual environment based on the captured image.

The rendering engine 112, which may be embodied as any type of firmware, hardware, software, circuitry, and/or combination thereof, may be configured to generate a virtual image and/or virtual environment from a 2D and/or 3D model, such as may be received from the master resource database 122 of the remote computing device 118 and/or stored in the local resource database 106 of the mobile computing device 104. The rendering engine 112 may be configured to render the objects in real-time (e.g., real-time rendering).

The application 114 may be embodied as any type of network-based software application (e.g., cloud application, network application, software-as-a-service (SaaS) application, etc.) configured to communicate with the remote computing device 118 (e.g., in a client-server architecture) over the network 116. As described herein, the application 114 may be configured to serve as a software-based interface between the user (e.g., via a graphical user interface (GUI) of the application) and the resource manager 104.

The application 114 may be configured to interface with the image analyzer 110 to retrieve the identified features and/or the rendering engine 112 to provide the image and/or objects to be rendered therein. In some scenarios, the resource manager 104 may be a portion of the application 114. In other words, resource manager 104 may be installed with the application, such that the initialization and/or the population of the 3D model data of the local resource database 106 is relative to the installation of the application 114 and/or the execution of the application 114. In some scenarios, one or more settings of the resource manager 104 may be controlled by the user via the user interface of the application 114.

The network 116 may be implemented as any type of wired and/or wireless network, including a local area network (LAN), a wide area network (WAN), a global network (the Internet), etc. Accordingly, the network 116 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, computer devices, storage devices, etc.

The remote computing device 118 may be embodied as any type of computer and/or storage device capable of performing the functions described herein. For example, the remote computing device 118 may be embodied as, but is not limited to, one or more servers (e.g., stand-alone, rack-mounted, etc.), computer devices, storage devices, routers, switches, and/or combination of computer blades and/or data storage devices (e.g., of a storage area network (SAN)) in a cloud architected network and/or data center. As such, while the remote computing device 118 is illustrated as a single computing device, in some scenarios, the remote computing device 118 may include more than one computing device (e.g., in a distributed computing architecture), one or more, or each, of which may be usable to perform at least a portion of the functions described herein.

It should be appreciated that the remote computing device 118 may contain like components to that of the illustrative mobile computing device 102 of FIG. 2. Accordingly, such like components are not described herein to preserve clarity of the description. In some scenarios in which the remote computing device 118 may include more than one computing device, one or more, or each, computing device of the remote computing device 118 may include different components (e.g., hardware/software resources), the types of which may be predicated upon the type and/or intended use of one or more, or each, computing device. For example, one or more computing devices of the remote computing device 118 may be configured as a database server with less computer capacity relative to the computer capacity of another of the computing devices of the remote computing device 118. Similarly, one or more other computing devices of the remote computing device 118 may be configured as an application server with more computer capacity relative to the computer capacity of another computing device of the remote computing device 118.

Figure 3:
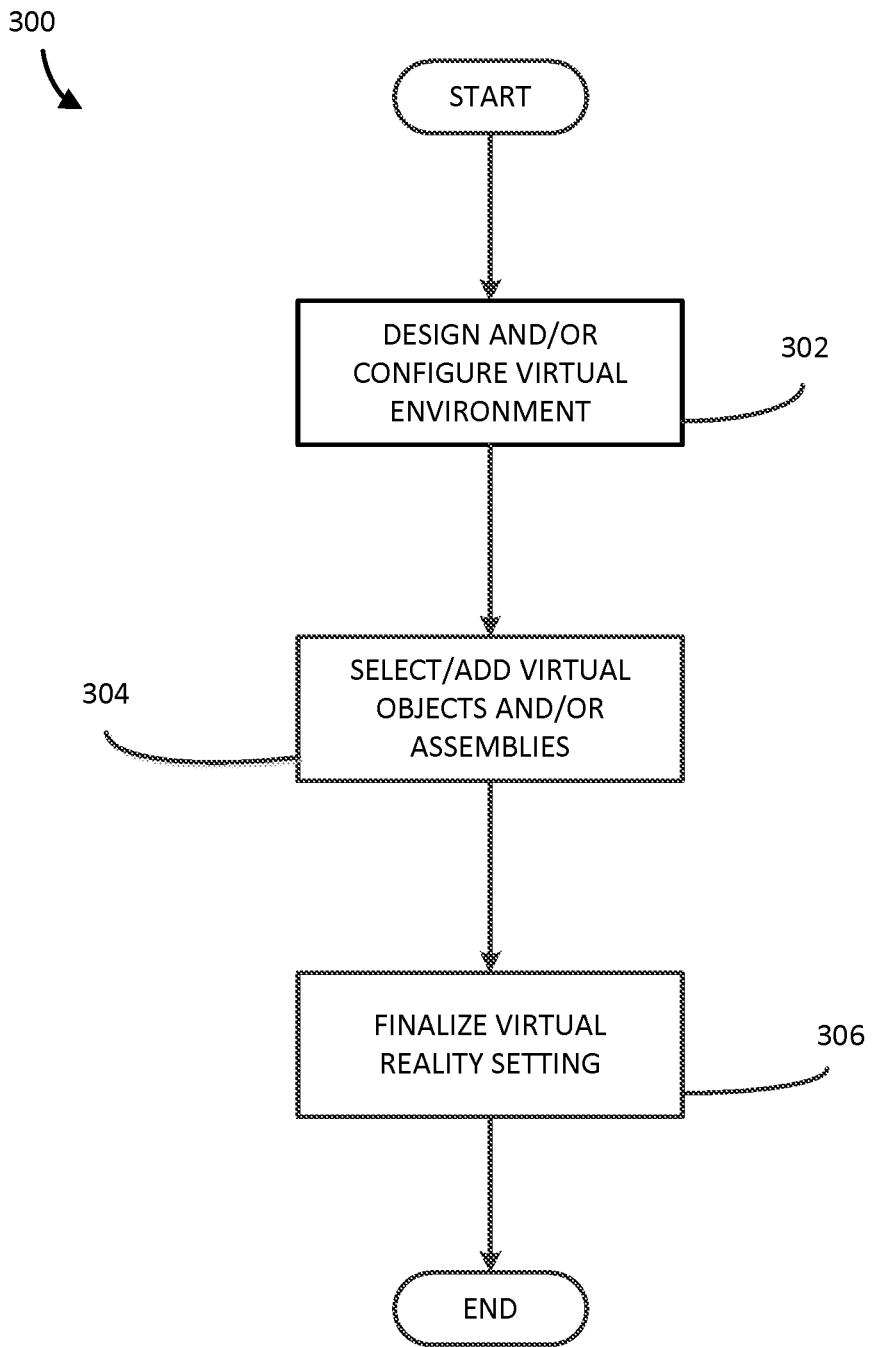
FIG. 3 is a flow diagram of at least one example method for composing a virtual reality setting in a mobile computing environment that may be executed by the mobile computing device of FIG. 1 and/or FIG. 2.
Figure 4:
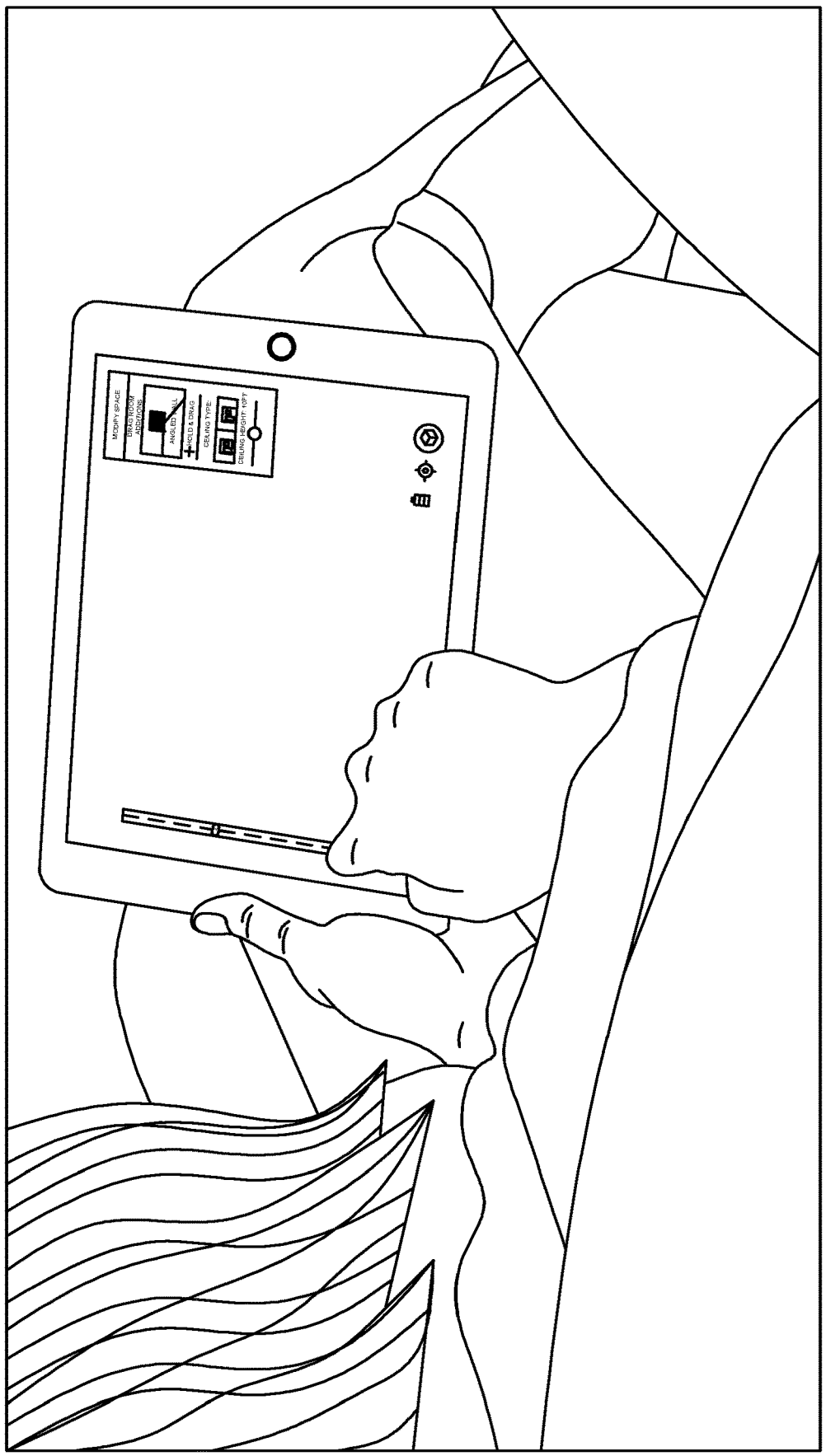
FIG. 4 shows an example technique of a technology for composing a virtual reality setting in a mobile computing device environment according to the present disclosure.

Referring now to FIG. 3, an illustrative method 300 is provided for composing a virtual reality setting in a mobile computing environment that may be executed by a mobile computing device (e.g., the mobile computing device 102 of FIG. 1), and/or more particularly by the resource manager 104 and/or application 114 of the mobile computing device 102. It should be appreciated that, prior to the method 300 being invoked, local resource database 106 and/or master resource database 122 may include any number of 3D models of various objects.

In an illustrative example, a furniture outlet may have 100 3D models stored in the master resource database 122, which correspond to 100 physical objects (e.g., pieces of furniture). Accordingly, despite the master resource database 122 having tens of thousands of 3D models, the application 114 may be specific to that furniture outlet. In some scenarios, perhaps for example when the application 114 is launched, among other scenarios, the resource manager 104 may be configured to pull an updated copy of those 3D models from the master resource database 122 for which the application 114 has access (e.g., based on an identifier of the application 114). In other words, the resource manager 104 may only pull/access the portions of the master resource database 122 to which the application has access (e.g., just the 100 3D models of the illustrative example).

The method 300 begins in block 302, in which application 114 is used to compose a virtual environment on mobile computing device 102. In some scenarios, display 210 of mobile computing device 102 may be a touchscreen display responsive to contact from a human digit, stylus, and/or other input device. Through interaction with display 210 of mobile computing device 102 and application 114, three dimensional boundaries of a virtual environment are established. Overhead lighting, doors, windows, flooring, floor coverings, and/or wall colors, and/or the like may be added to the virtual environment within the three dimensional boundaries.

In block 304, one or more virtual items (e.g., virtual objects and/or virtual assemblies) may be selected and/or added to the virtual environment designed/configured in block 302. As described herein, a user may indicates which 3D model(s) to render and/or a location at which to render the 3D model, perhaps for example relative to the virtual environment captured by the mobile computing device 102 (e.g., via the display 210 of the mobile computing device 102 and/or via the camera sensor 216 of the mobile computing device 102). The application 114 may request the 3D model from the resource manager 104, perhaps for example using identifiable information for the object represented by the 3D model. The resource manager 104 may determine whether the 3D model is stored in the local resource database 106. The resource manager 120 of the remote computing device 118 may use the request to determine which 3D model is being requested and/or to return the requested 3D model to the resource manager 104 of the mobile computing device 102. Perhaps for example if the 3D model is not stored in the local database 106, among other scenarios, the resource manager 104 may store the 3D model received from the remote computing device 118 to the local resource database 106. The resource manager 104 may transmit the 3D model to the rendering platform 108 such that the rendering engine 112 of the rendering platform 108 can render the object, perhaps for example as a function of the 3D model received from the resource manager 104, among other scenarios.

In block 306, the virtual reality setting may be finalized and/or readied for accessing by a virtual reality system. Composition of the virtual environment and/or selection and/or addition of virtual objects may be done iteratively. For example, a preliminary virtual environment may be composed, and then after virtual objects are selected and/or added the virtual environment may be modified. Virtual objects may be added to and/or subtracted from the modified virtual environment, and then may be modified again. The process can be repeated over and over, for example.

In one or more techniques, system 100 and/or mobile computing device 102 may be configured to determine the resolution, and therefore the file size, of 3D models on an object-specific and/or platform-specific basis. For instance, system 100 and/or mobile computing device 102 may be configured to asynchronously and/or automatically generate different resolutions and/or compression formats for one or more, or all, supported operating systems and/or hardware devices. Object and/or platform combinations with a specific resolution of a 3D model that may be useful are identified by system 100 and/or mobile computing device 102. System 100 and/or mobile computing device 102 may identify which objects in a room type and/or application may be featured and/or may have higher resolution.

In one or more techniques, system 100 and/or mobile computing device 102 may be configured to recognize device capacity and adapt accordingly. For example, for a device and a virtual reality setting, system 100 and/or mobile computing device 102 may have a certain budget for 3D model memory, perhaps because of how many objects will be in the virtual reality setting and/or rendering capacity of the device. Remote computing device 118 and/or mobile computing device 102 can determine/identify what the mobile device's capacity may be and/or may serve/request the (e.g., correct, right, best) texture resolution based upon the capability of the mobile device. System 100 and/or mobile computing device 102 may be configured to allocate more memory for certain (e.g., more important) objects.

In one or more techniques, system 100 and/or mobile computing device 102 may be configured to interface with commerce systems and/or inventory management systems. Commerce systems and/or inventory management systems may define objects as "models" with "options." For instance, a rug might come in three sizes and/or three colors. In a commerce system and/or inventory management system, there may be a model ID and/or object ID for the rug itself, and/or perhaps a SKU for one or more, or each, variation of size and/or color. The model ID and/or object ID alone might be insufficient to provide the user with a rendering of one or more, or all, options of the object. In one or more techniques, system 100 and/or mobile computing device 102 may be configured to resolve one or more, or all, possible SKU options, and/or to render 3D models of one or more, or each, object using one or more, or each, possible variation. In one or more techniques, system 100 and/or mobile computing device 102 may be configured to process 3D models in relation to one or more, or each SKU option, and/or may understand/comprehend/determine the relationship of the model ID and/or object ID to the SKU.

In one or more techniques, system 100 and/or mobile computing device 102 may be configured to use procedural modeling. For example, system 100 and/or mobile computing device 102 may be configured for cabinet doors by defining a 2D profile of the door and/or the rules for how to offset door and/or drawer style profiles from the face of a cabinet. System 100 and/or mobile computing device 102 may be configured to dynamically "stretch" the door parameters to fit one door to any cabinet size, perhaps for example instead of modeling every door shape and/or size. For example, system 100 and/or mobile computing device 102 can be configured to do this for crown molding, shoe molding, countertops, countertop edge profiles, baseboards, ceiling structures, showers, and/or ceiling lights, and/or the like.

In one or more techniques, system 100 and/or mobile computing device 102 may be configured to render "assemblies," which are objects mounted on other objects and/or arranged into some kind of layout. For example, cabinets in a kitchen, a faucet on a vanity, and/or a lamp on a table are examples of assemblies. In one or more techniques, system 100 and/or mobile computing device 102 may be configured with the ability to pre-assemble objects into compound objects and/or assemblies, and/or apply a specific price to the compound object and/or assembly. In one or more techniques, system 100 and/or mobile computing device 102 may be configured to allow for the use of rules and/or metadata defining fit, location, and/or compatibility, which may provide the ability to mount an object on another object. In one or more techniques, the rules and/or metadata for defining fit, location, and/or compatibility may be predetermined and/or may be directly loaded into the system 100 and/or mobile computing device 102 for use. In one or more techniques, the rules and/or metadata for defining fit, location, and/or compatibility may be determined at run-time. In one or more techniques, the rules and/or metadata for defining fit, location, and/or compatibility may be provided to the system 100 and/or mobile computing device 102 using predetermined information and/or information obtained at run-time. System 100 and/or mobile computing device 102 can be configured such that assemblies can be editable or not editable.

In one or more techniques, system 100 and/or mobile computing device 102 may be configured to allow for business rules for objects and/or assemblies that define what object and/or assembly can physically fit, where the object and/or assembly fits, how object and/or assembly is oriented, and/or whether object and/or assembly can be changed. In one or more techniques, the business rules may be predetermined and/or may be directly loaded into the system 100 and/or mobile computing device 102 for use. In one or more techniques, the business rules may be determined at run-time. In one or more techniques, the business rules may be provided to the system 100 and/or mobile computing device 102 using predetermined information and/or information obtained at run-time.

For example, system 100 and/or mobile computing device 102 may be configured with an "object class" concept to define compatibility/fit between one or more objects. For example, a 3-hole faucet may fit (e.g., only) on a 3-hole vanity, and/or a sofa (e.g., only) rests on a floor, and/or a dishwasher may be (e.g., only) against a wall and/or under a countertop. Perhaps for example if a user attempts to place two virtual objects in the same virtual space, system 100 and/or mobile computing device 102 may be configured to determine the compatibility/fit between such objects and/or arrange them accordingly. For example, if a user attempts to place a virtual end table and a virtual lamp in the same virtual location, system 100 and/or mobile computing device 102 may be configured to arrange the virtual end table on the floor of the virtual space, and/or arrange the virtual lamp on top of the virtual end table. System 100 and/or mobile computing device 102 may be configured to allow for various levels of specificity to determine fit.

Sometimes there may be (e.g., only) one specific object that can fit on another specific object. Other times there may be a larger set of objects that can fit together. Perhaps as with physical compatibility, system 100 and/or mobile computing device 102 may be configured to allow for merchandising rules that may allow the content managers to set which categories and/or other object attributes are allowed to fit in a location. For example, system 100 and/or mobile computing device 102 may be configured such that the user can put any 3-hole faucet on a 3-hole vanity (e.g., using object class), but perhaps (e.g., only) Kohler® faucets may be allowed if the users want a specific price over a Labor Day Sale (e.g., using object manufacturer).

In one or more techniques, system 100 and/or mobile computing device 102 may be configured to allow for composition properties defining how an object can be composed in a scene. For example, regarding refrigerators, system 100 and/or mobile computing device 102 may be configured to require that refrigerators have to be mounted on a floor and/or against a wall, that refrigerators cannot be rotated, and/or that refrigerator doors can be rotated (e.g., only) about a specific anchoring point and/or within a specific arc.

In one or more techniques, system 100 and/or mobile computing device 102 may be configured to allow for composition properties that allow animations of objects for manipulating object parts, for example to show the inside and/or some range of motion. For example, regarding refrigerators, system 100 and/or mobile computing device 102 may be configured to allow animation to be data-driven and/or assigned for a class of objects vs. assigned to one or more, or each, specific 3D model. In one or more techniques, system 100 and/or mobile computing device 102 may be configured to allow objects to make sounds, and/or for lighting (e.g., lights, lamps, and/or ceiling fans) to have properties that allow control of angle, spread, and/or intensity.

FIG. 4 to FIG. 27 show illustrative example(s) of use of system 100 and/or mobile computing device 102 for composing a virtual reality setting in a mobile computing environment, according to one or more techniques. For example, mobile computing device 102 may be a tablet device, such as, for example, an iPad®. However, mobile computing device 102 is not limited to tablet devices.

As shown in FIG. 4 to FIG. 27, display 210 of mobile computing device 102 may be a touchscreen display responsive to contact from a human digit, stylus, and/or other input device. Through interaction with display 210 of mobile computing device 102 and application 114, a user may input the boundaries of a floor layout for a particular virtual environment that is of interest to user.

Figure 5:
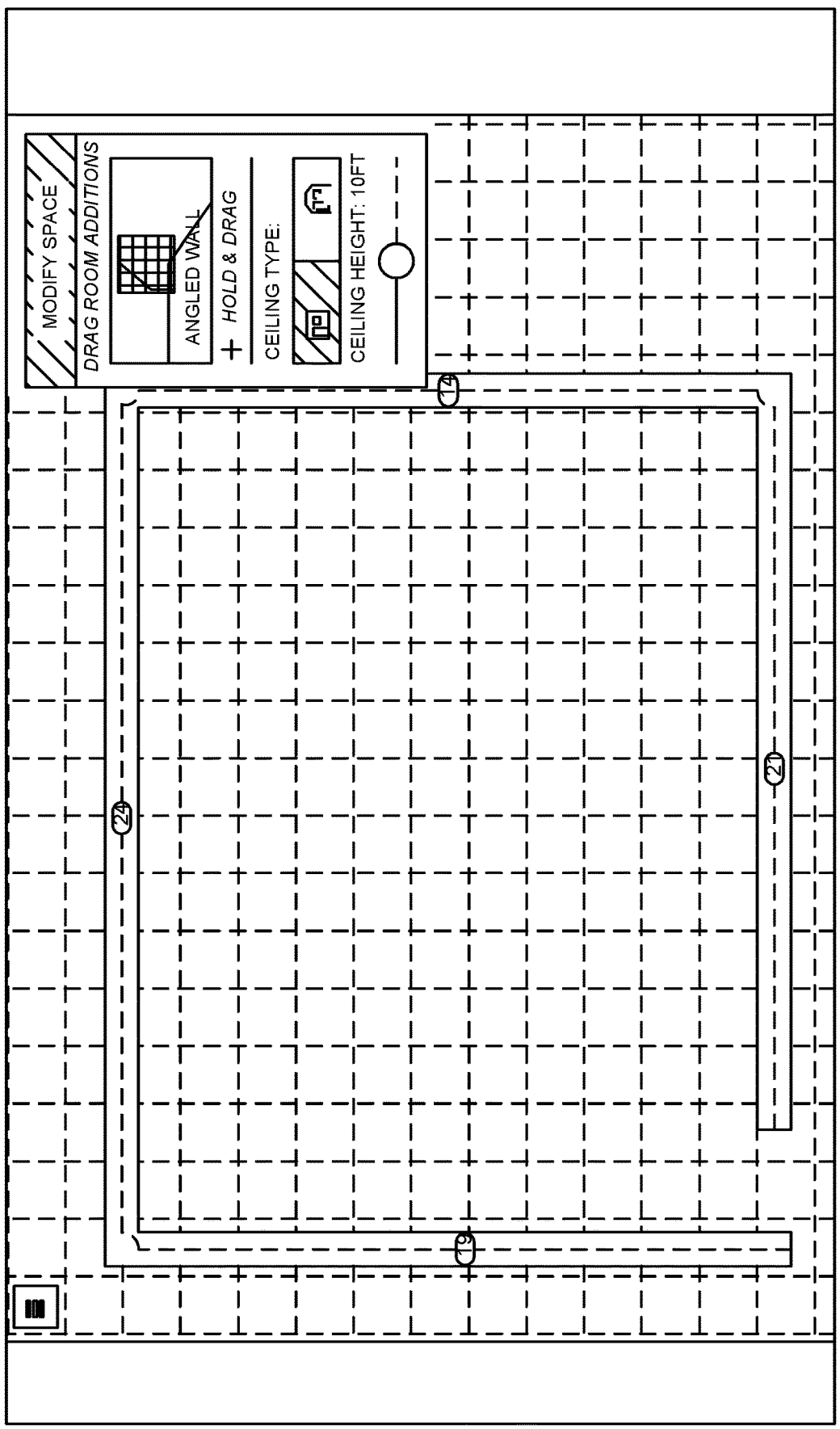
FIG. 5 shows an example technique of a technology for composing a virtual reality setting in a mobile computing device environment according to the present disclosure.
Figure 6:
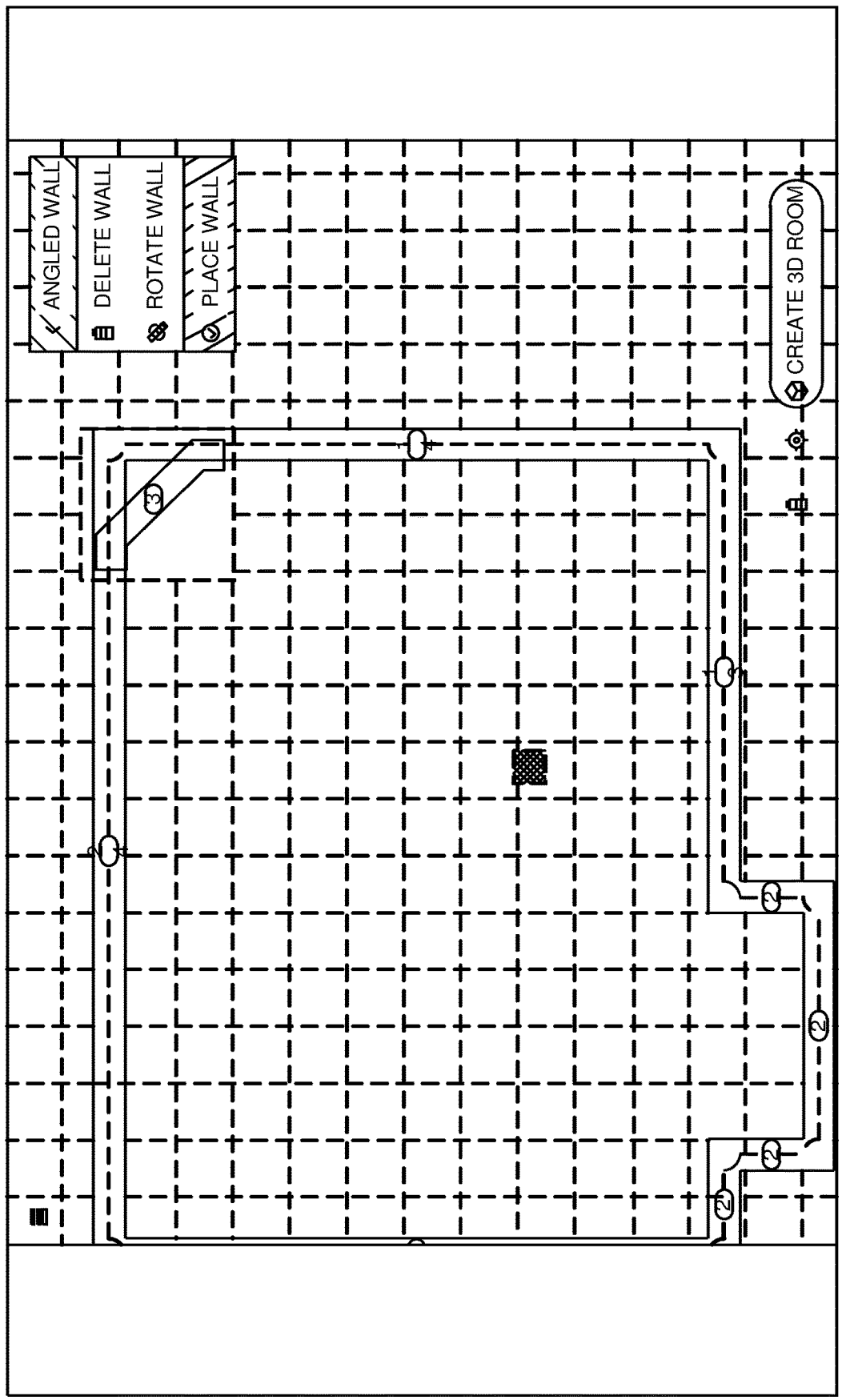
FIG. 6 shows an example technique of a technology for composing a virtual reality setting in a mobile computing device environment according to the present disclosure.
Figure 7:
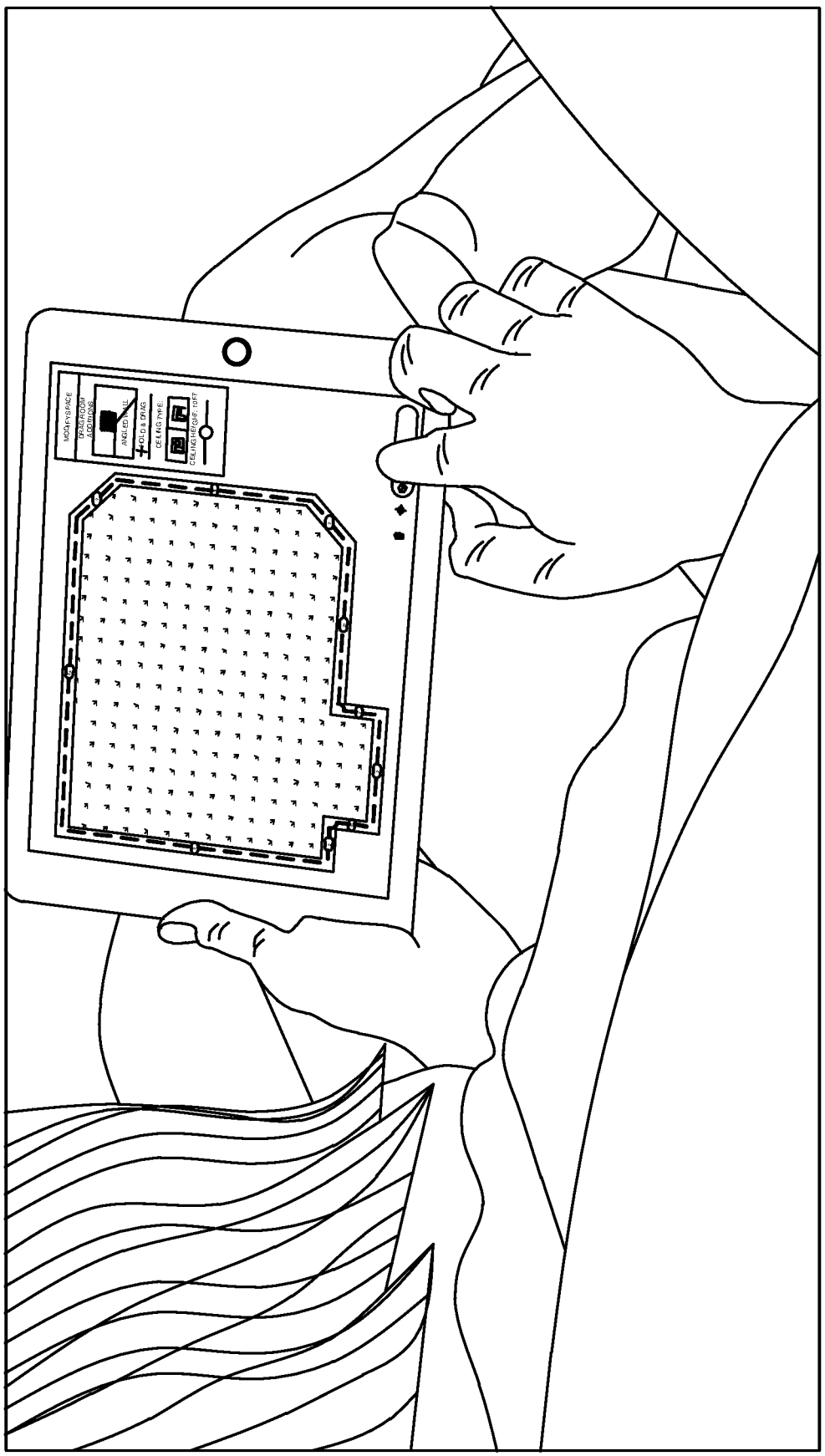
FIG. 7 shows an example technique of a technology for composing a virtual reality setting in a mobile computing device environment according to the present disclosure.

As shown in FIG. 5, display 210 shows a grid that assists the user is designing a floor layout that may be consistent with a predetermined scale. Also as shown in FIG. 5, the user may be presented with the opportunity to define the ceiling height and/or overhead lighting for the virtual environment of interest, and/or may be presented with options for configuring a non-orthogonal layout of the boundaries of the virtual environment of interest. For example, as shown in FIG. 5 and/or FIG. 6, the user may insert an angled wall object in place of a perpendicular intersection of two walls of the virtual environment of interest.

Figure 8:
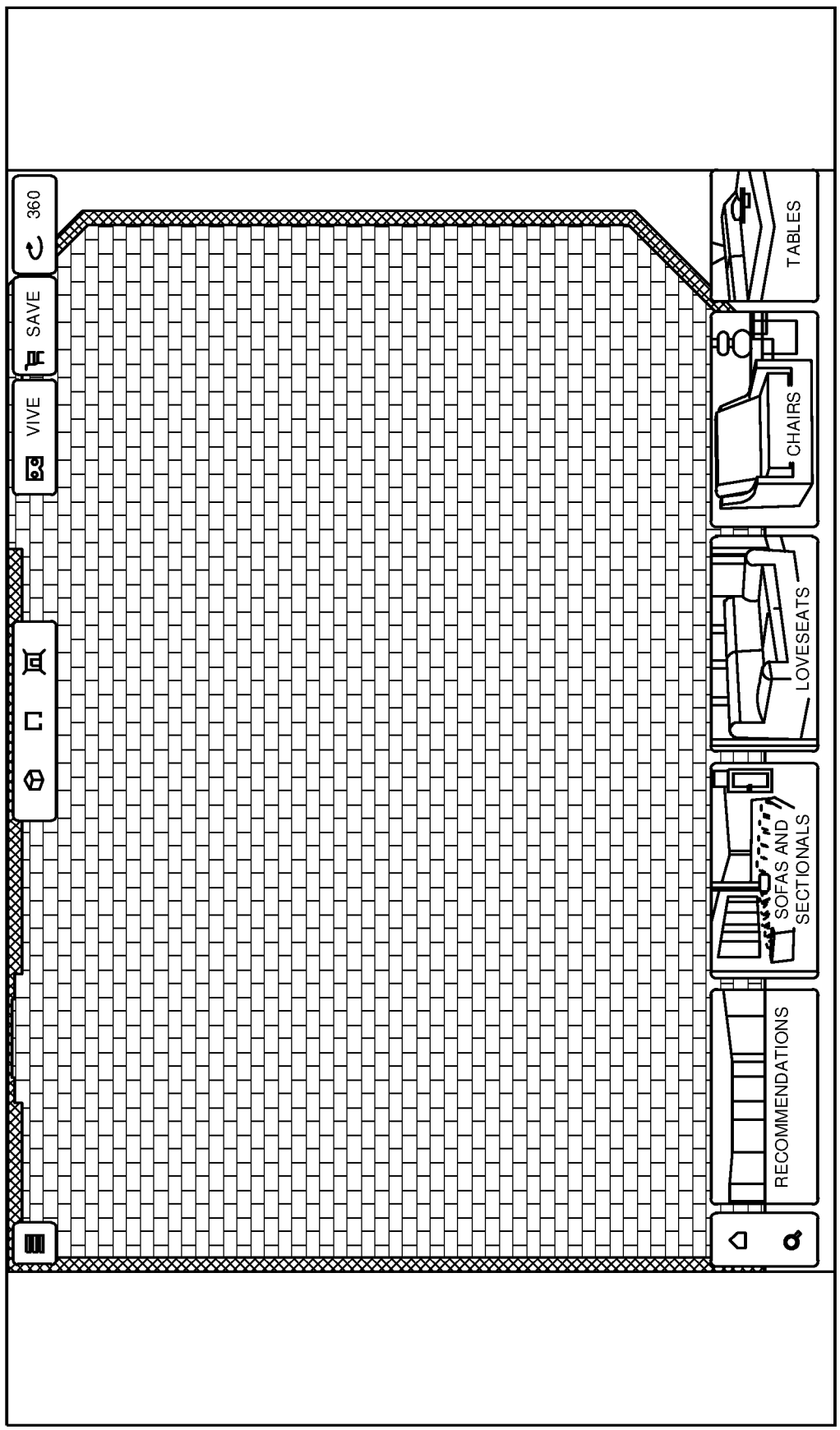
FIG. 8 shows an example technique of a technology for composing a virtual reality setting in a mobile computing device environment according to the present disclosure.

As shown in FIG. 8, the user may insert a hardwood flooring object within the boundaries of the virtual environment of interest. System 100 and/or mobile computing device 102 may apply the method shown in FIG. 3 and as described herein to obtain the meshes, textures, materials, and/or other rendering objects that may be useful to render the hardwood floor object within the virtual environment of interest designed/configured in FIG. 4 to FIG. 8.

Figure 9:
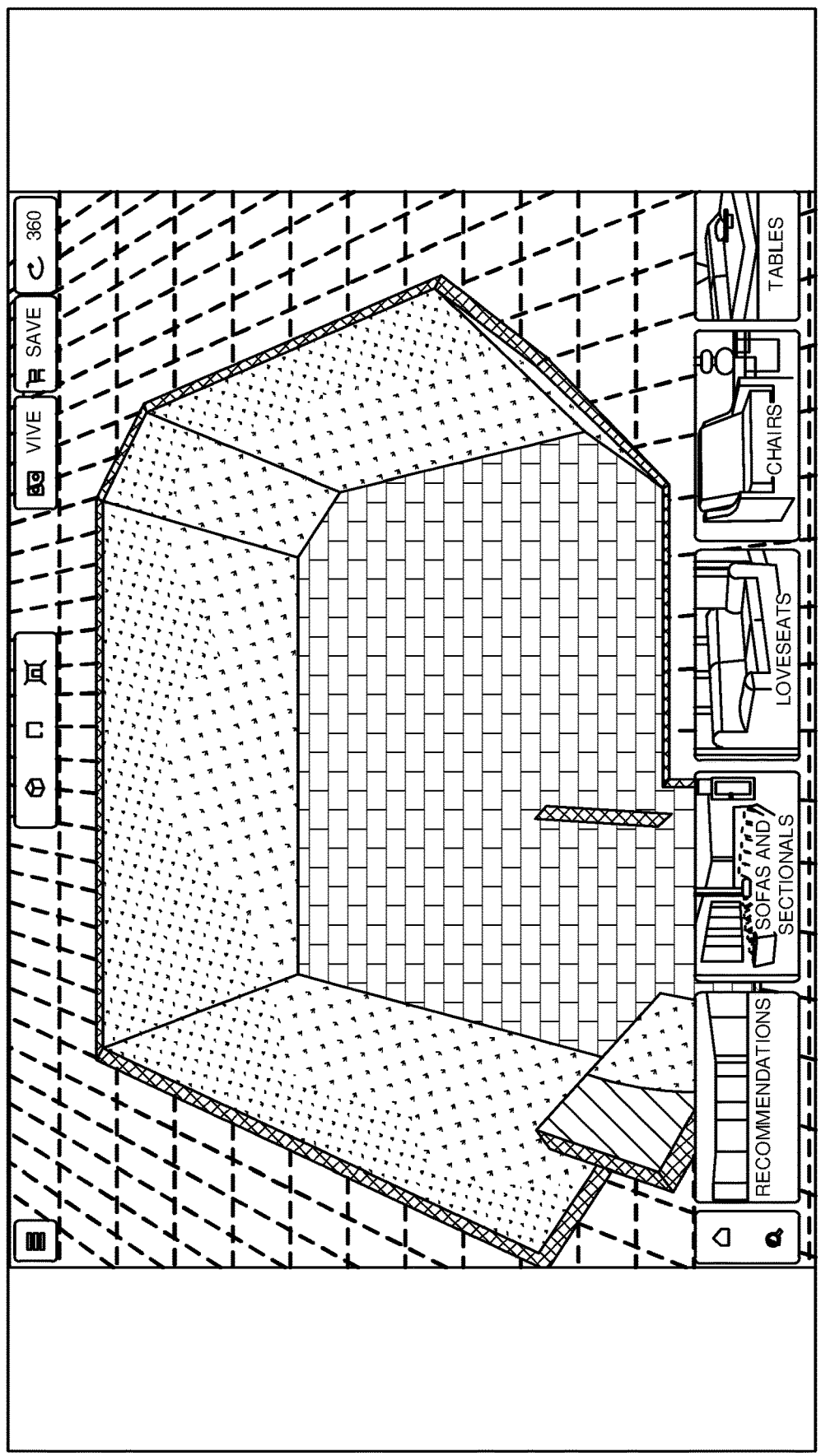
FIG. 9 shows an example technique of a technology for composing a virtual reality setting in a mobile computing device environment according to the present disclosure.
Figure 10:
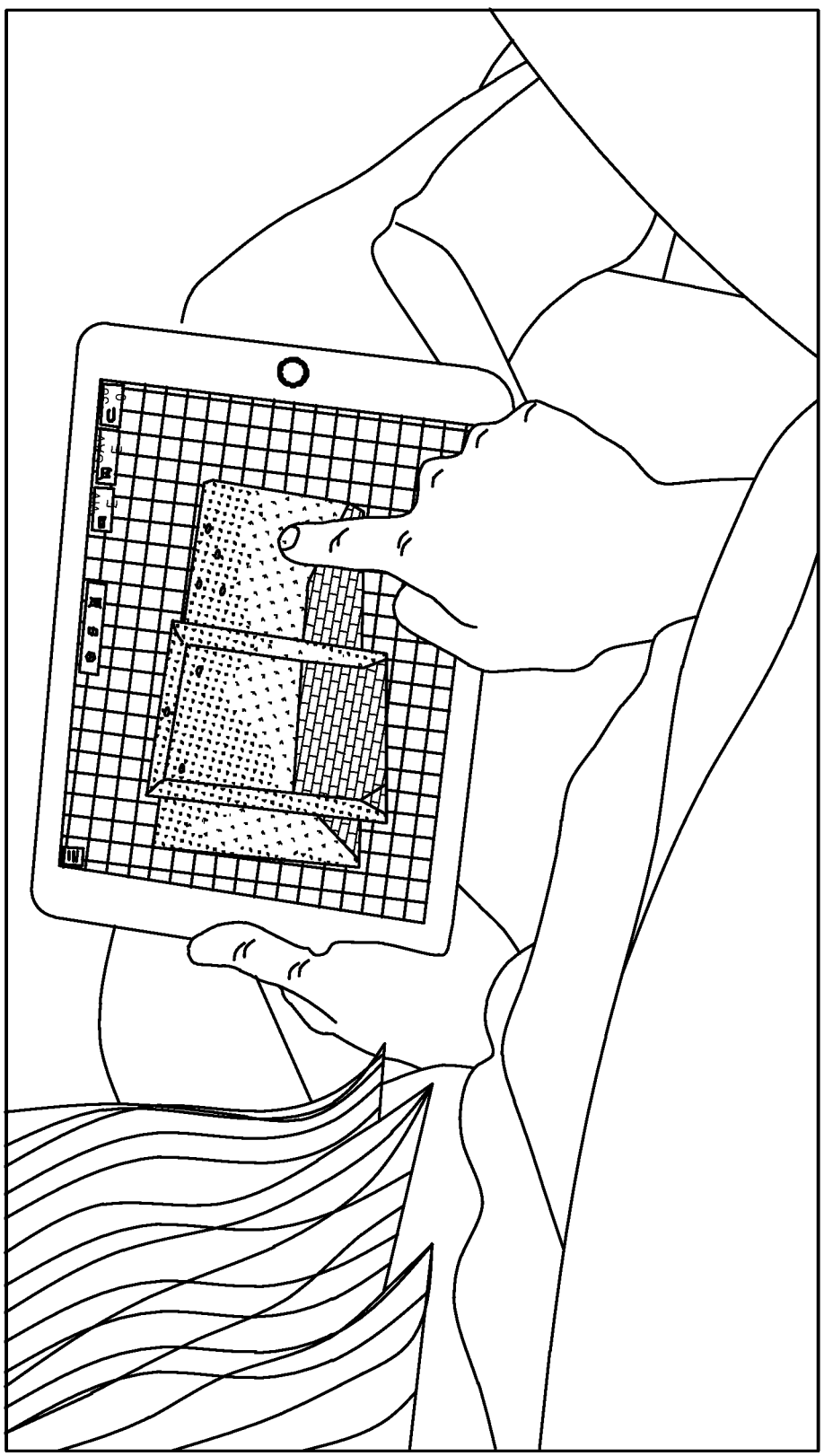
FIG. 10 shows an example technique of a technology for composing a virtual reality setting in a mobile computing device environment according to the present disclosure.
Figure 11:
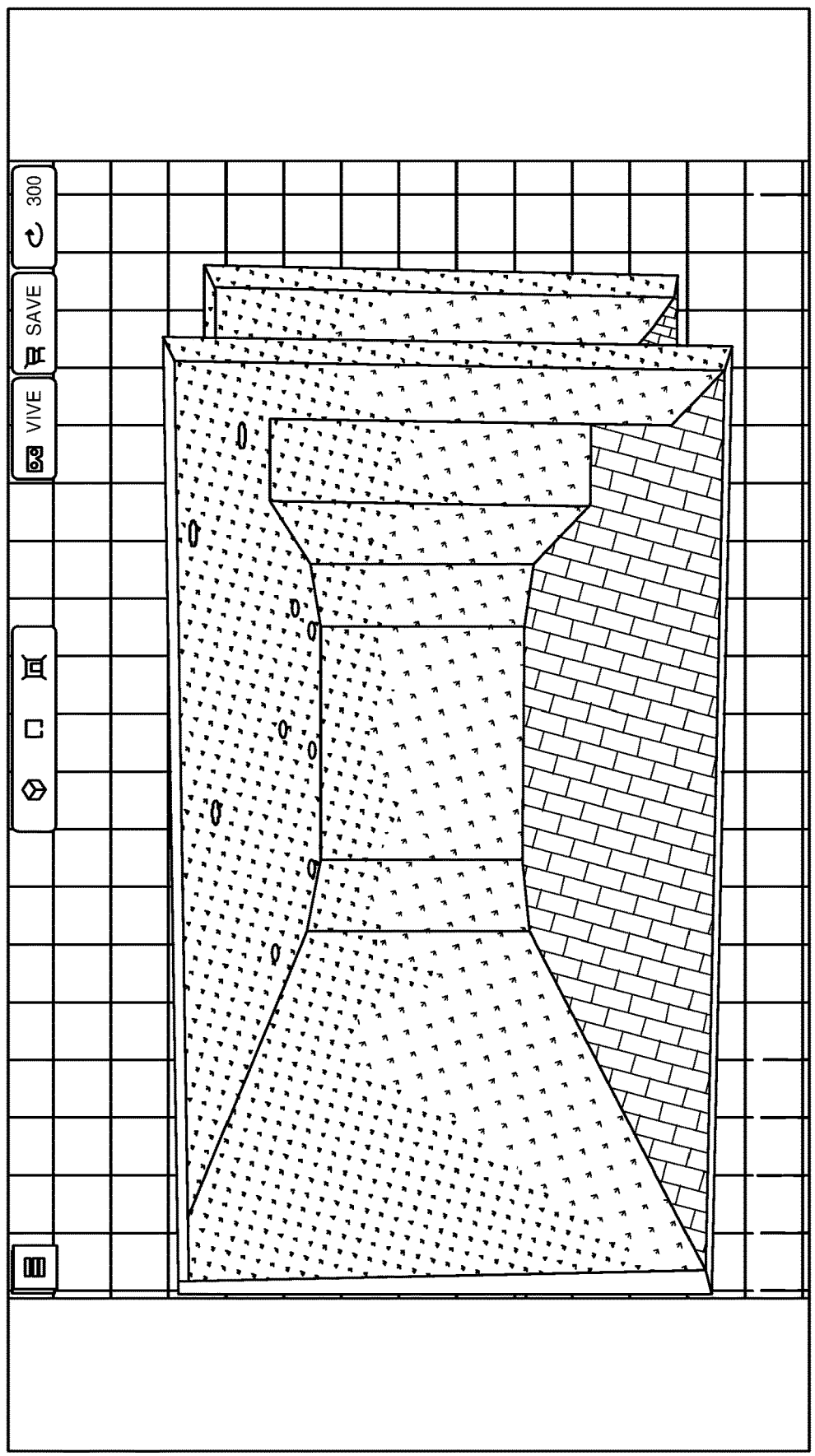
FIG. 11 shows an example technique of a technology for composing a virtual reality setting in a mobile computing device environment according to the present disclosure.
Figure 12:
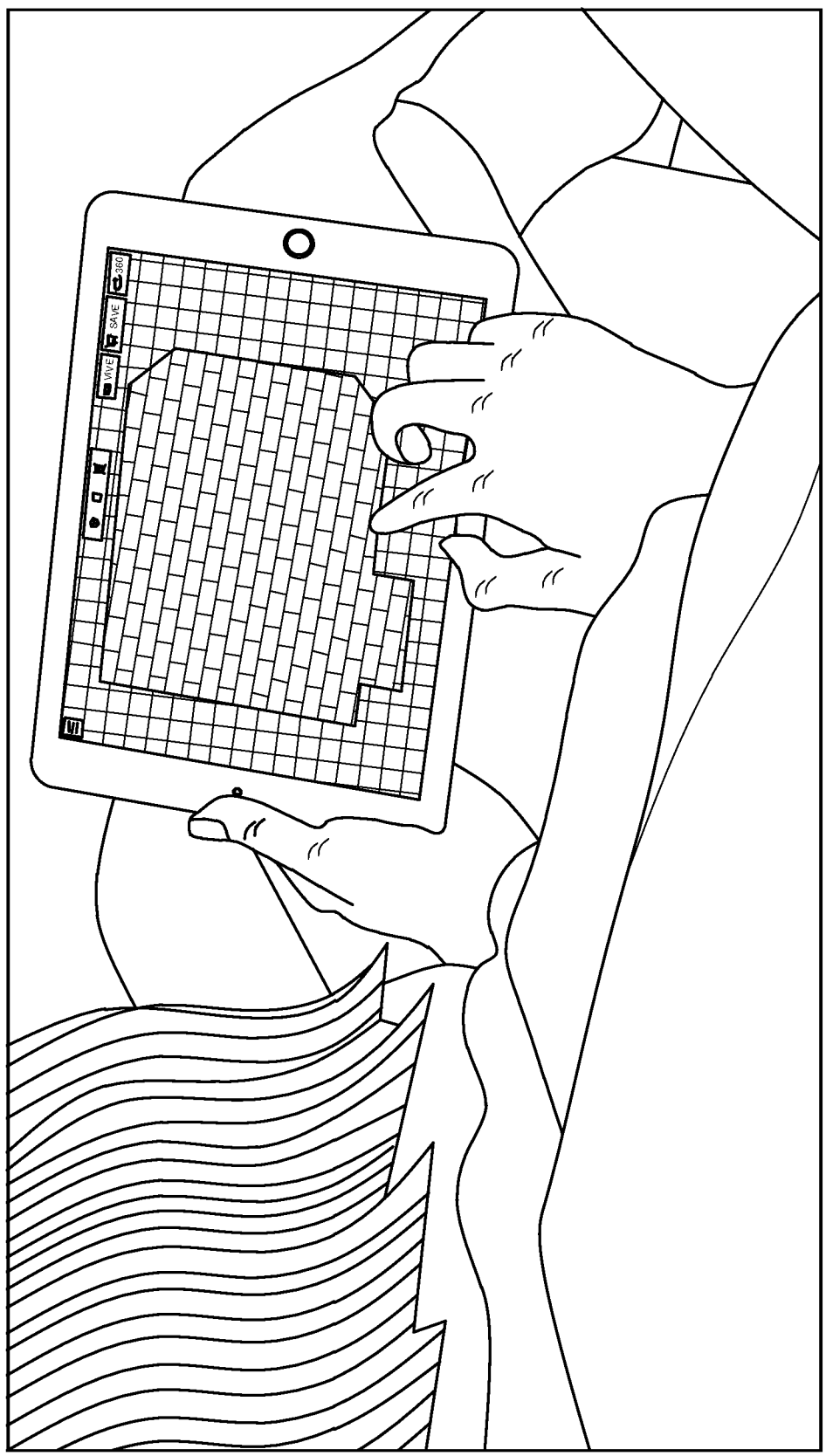
FIG. 12 shows an example technique of a technology for composing a virtual reality setting in a mobile computing device environment according to the present disclosure.
Figure 13:
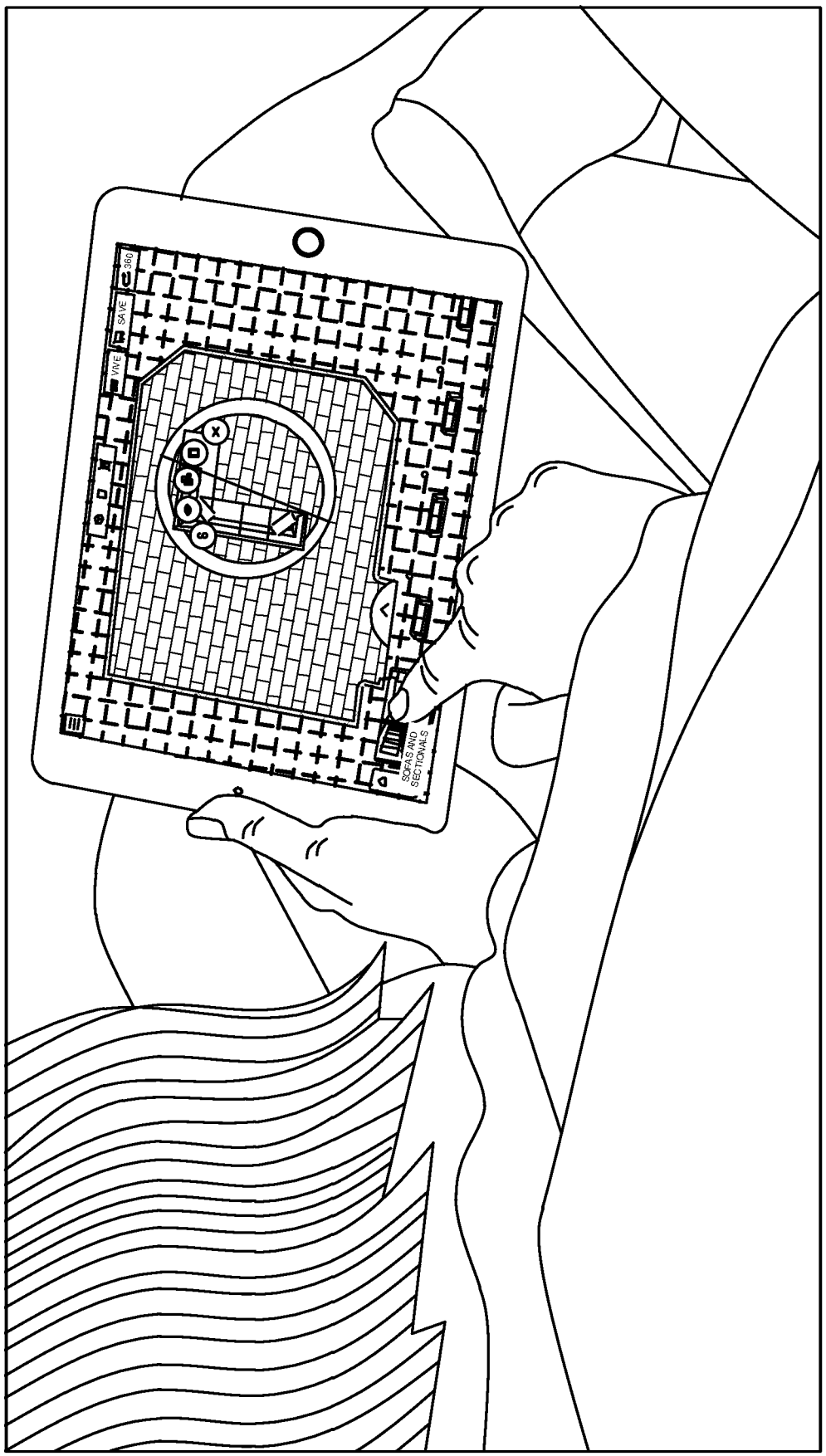
FIG. 13 shows an example technique of a technology for composing a virtual reality setting in a mobile computing device environment according to the present disclosure.
Figure 14:
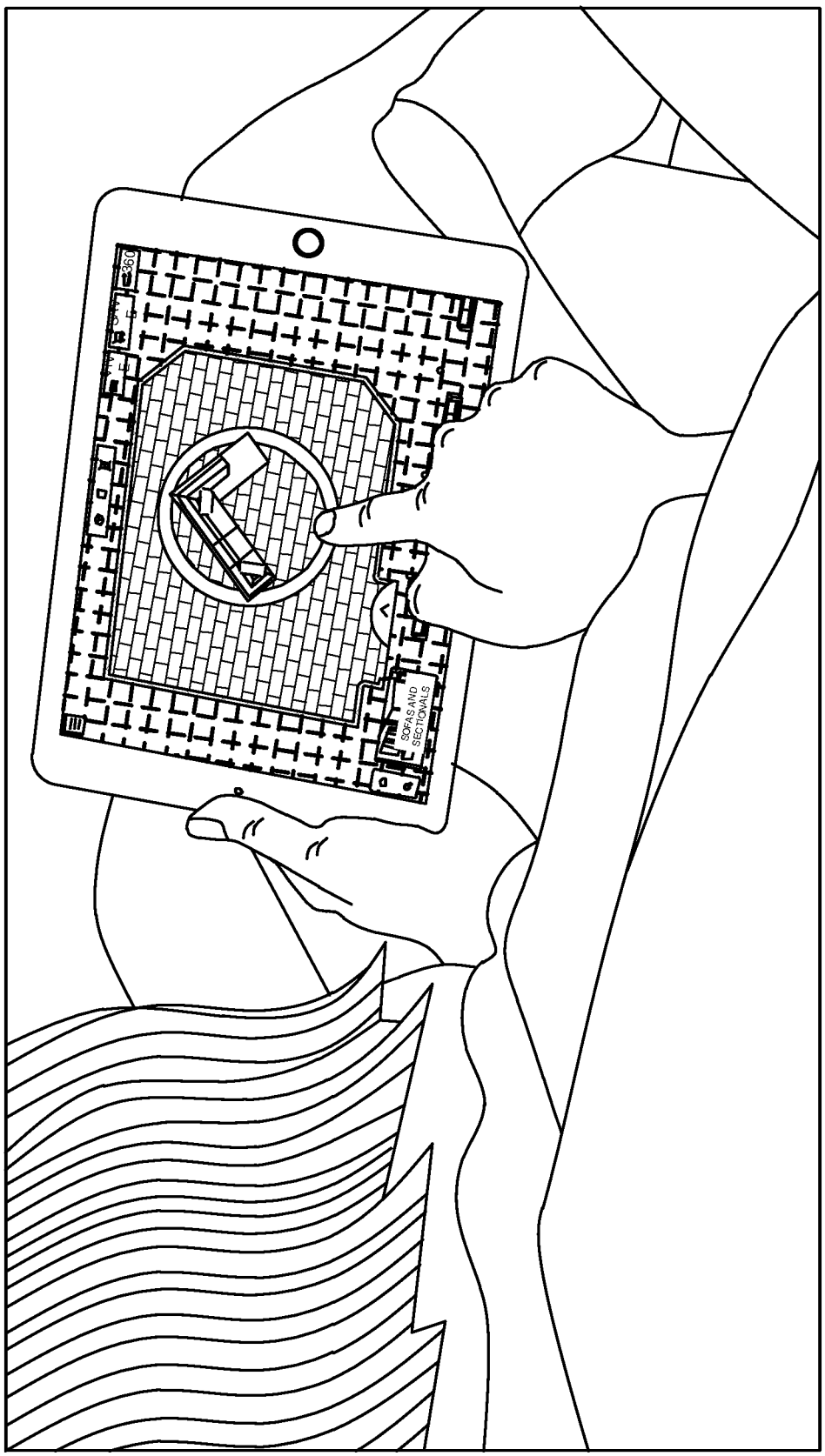
FIG. 14 shows an example technique of a technology for composing a virtual reality setting in a mobile computing device environment according to the present disclosure.
Figure 15:
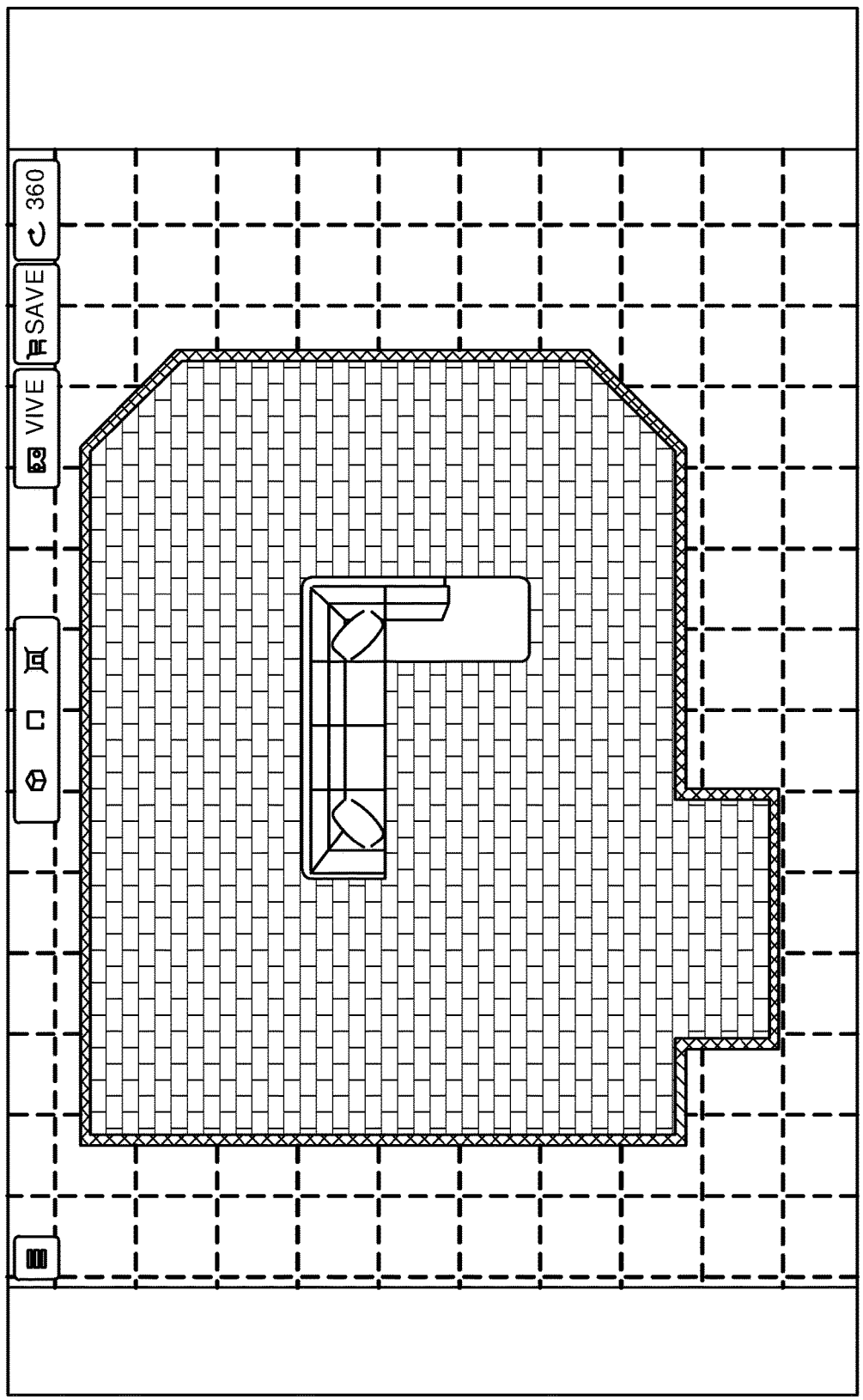
FIG. 15 shows an example technique of a technology for composing a virtual reality setting in a mobile computing device environment according to the present disclosure.
Figure 16:
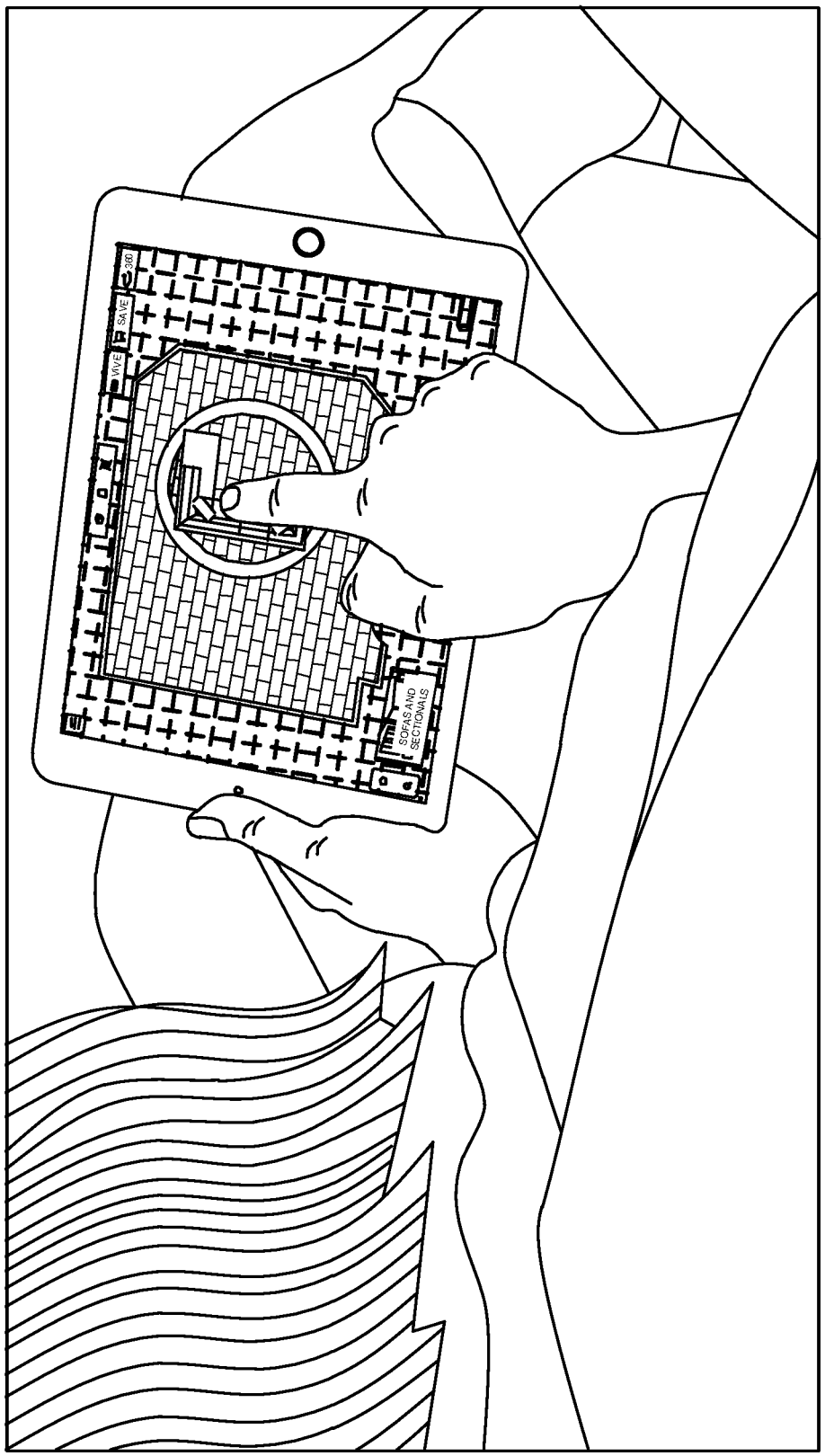
FIG. 16 shows an example technique of a technology for composing a virtual reality setting in a mobile computing device environment according to the present disclosure.
Figure 17:
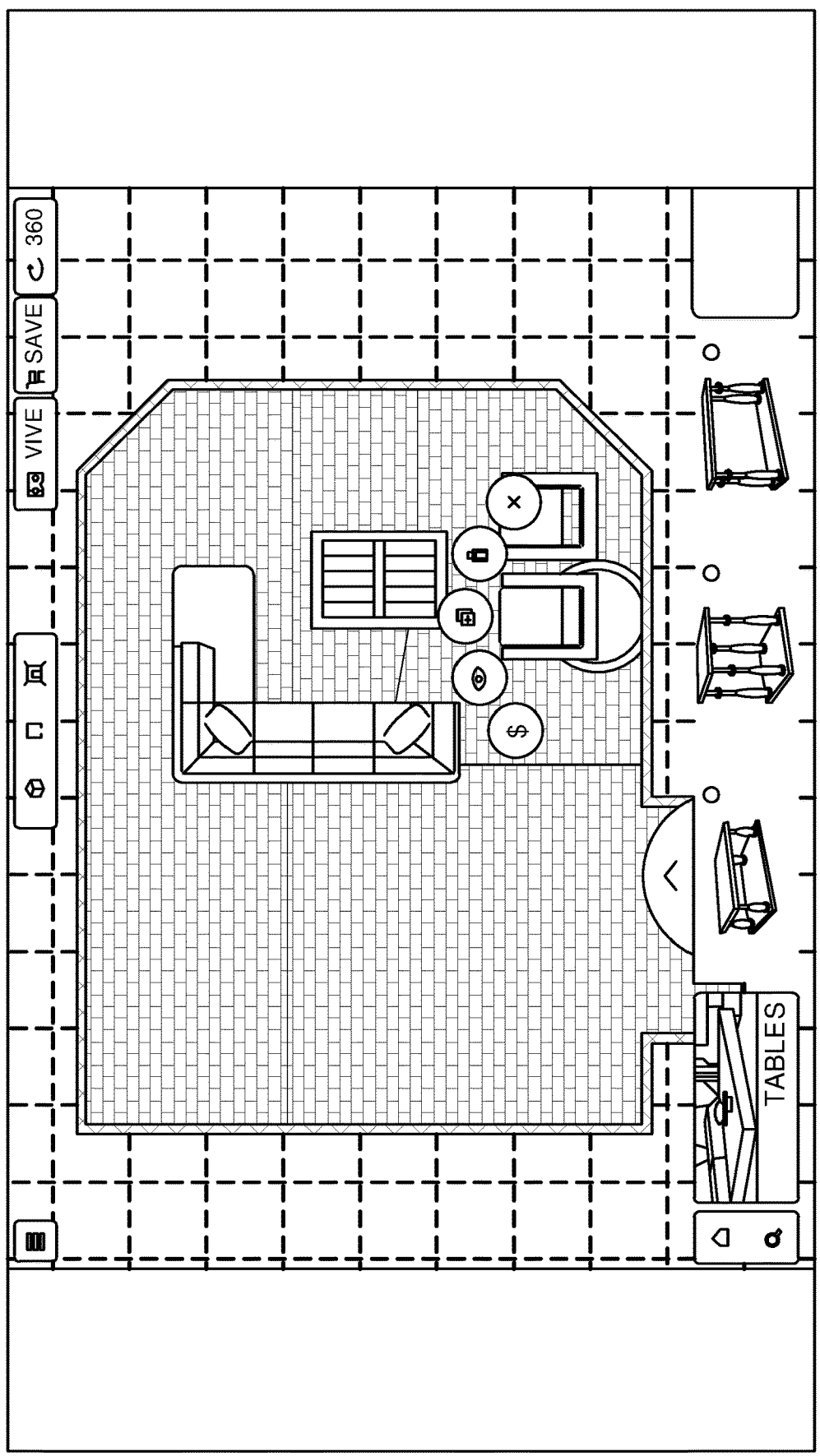
FIG. 17 shows an example technique of a technology for composing a virtual reality setting in a mobile computing device environment according to the present disclosure.

In one or more techniques, the user may rotate the rendered virtual environment of interest around an x-, y-, and z-axis, perhaps for example to inspect the virtual environment of interest from multiple points of view. For purpose of this non-limiting example, the x-axis and y-axis are parallel to the surface of display 210, and the z-axis is perpendicular to the surface of display 201. As shown in FIG. 9 to FIG. 12, through interaction with display 210, the user can manipulate the point of view of the virtual environment of interest on one or more, or all three, axes. As shown in FIG. 9 to FIG. 11, changing the point of view may make the overhead lighting objects that previously were selected by user visible.

As shown in FIG. 12 to FIG. 20, through interaction with display 210, the user can populate the virtual environment of interest with furniture objects that, in one or more techniques, may be selected from menus provided to the user on display 210 and/or input as a SKU. System 100 and/or mobile computing device 102 may apply the method shown in FIG. 3 and described herein to obtain the meshes, textures, materials, and other rendering objects that may be useful to render the furniture objects within the virtual environment of interest.

Figure 18:
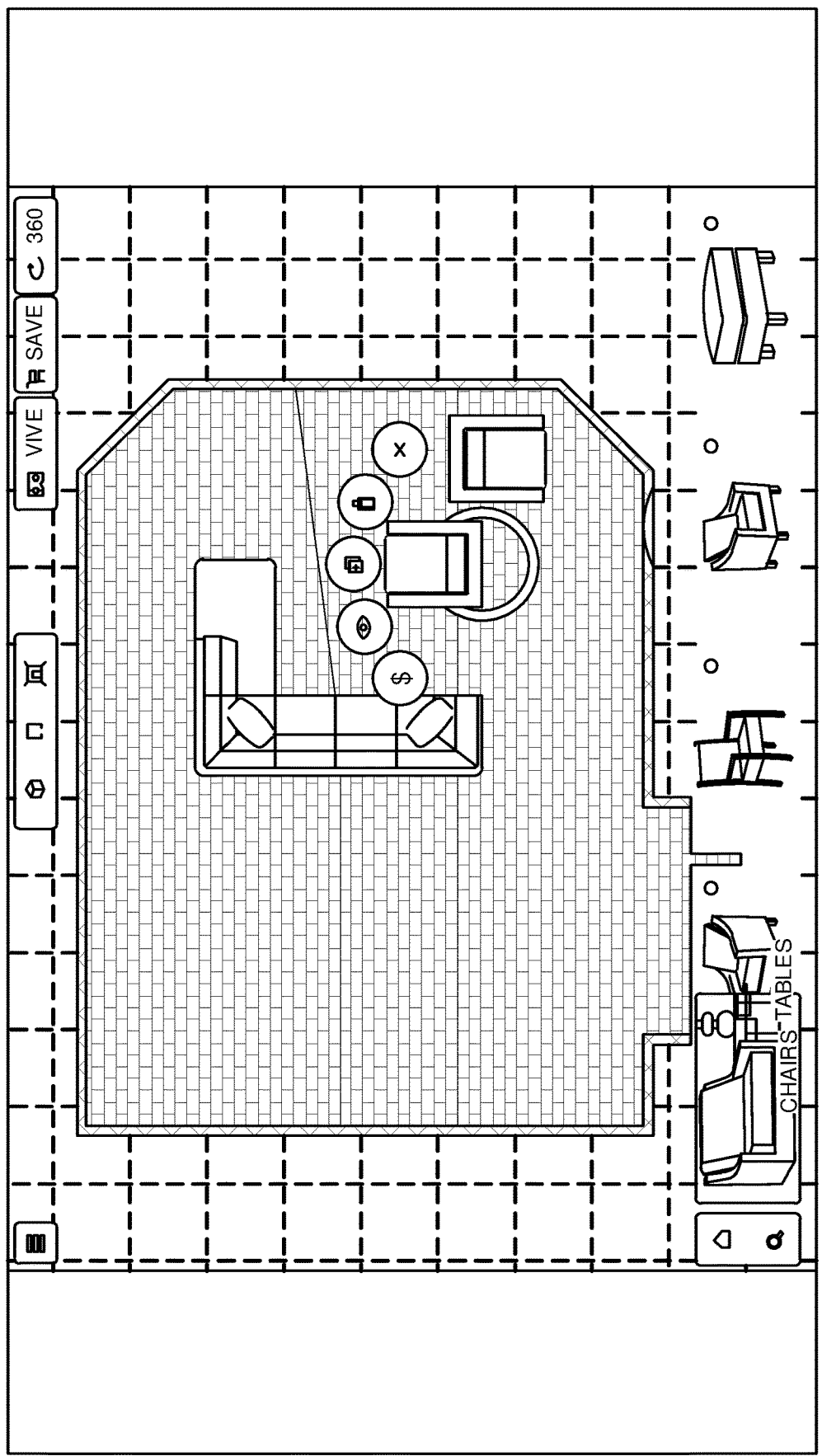
FIG. 18 shows an example technique of a technology for composing a virtual reality setting in a mobile computing device environment according to the present disclosure.
Figure 19:
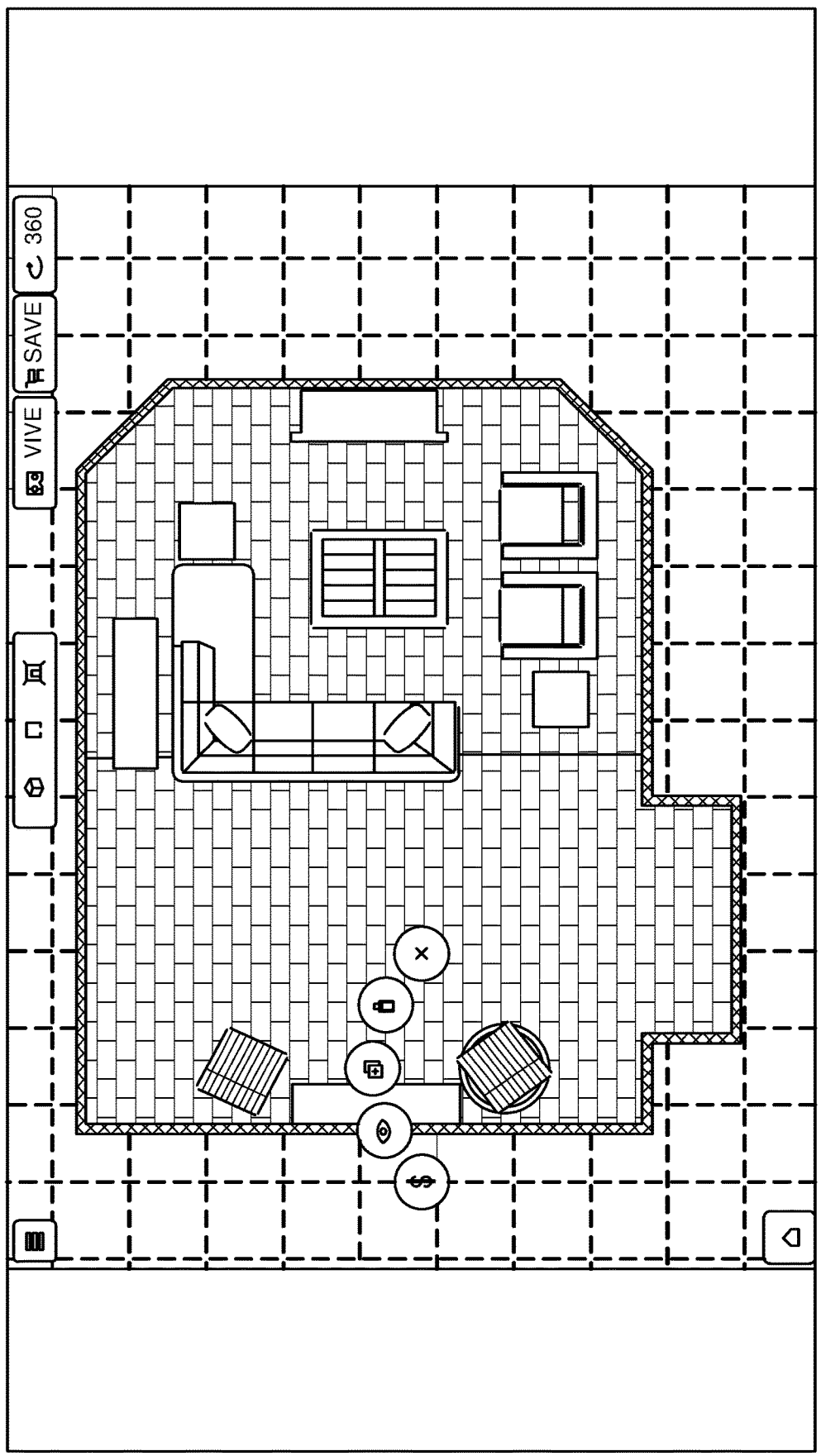
FIG. 19 shows an example technique of a technology for composing a virtual reality setting in a mobile computing device environment according to the present disclosure.
Figure 20:
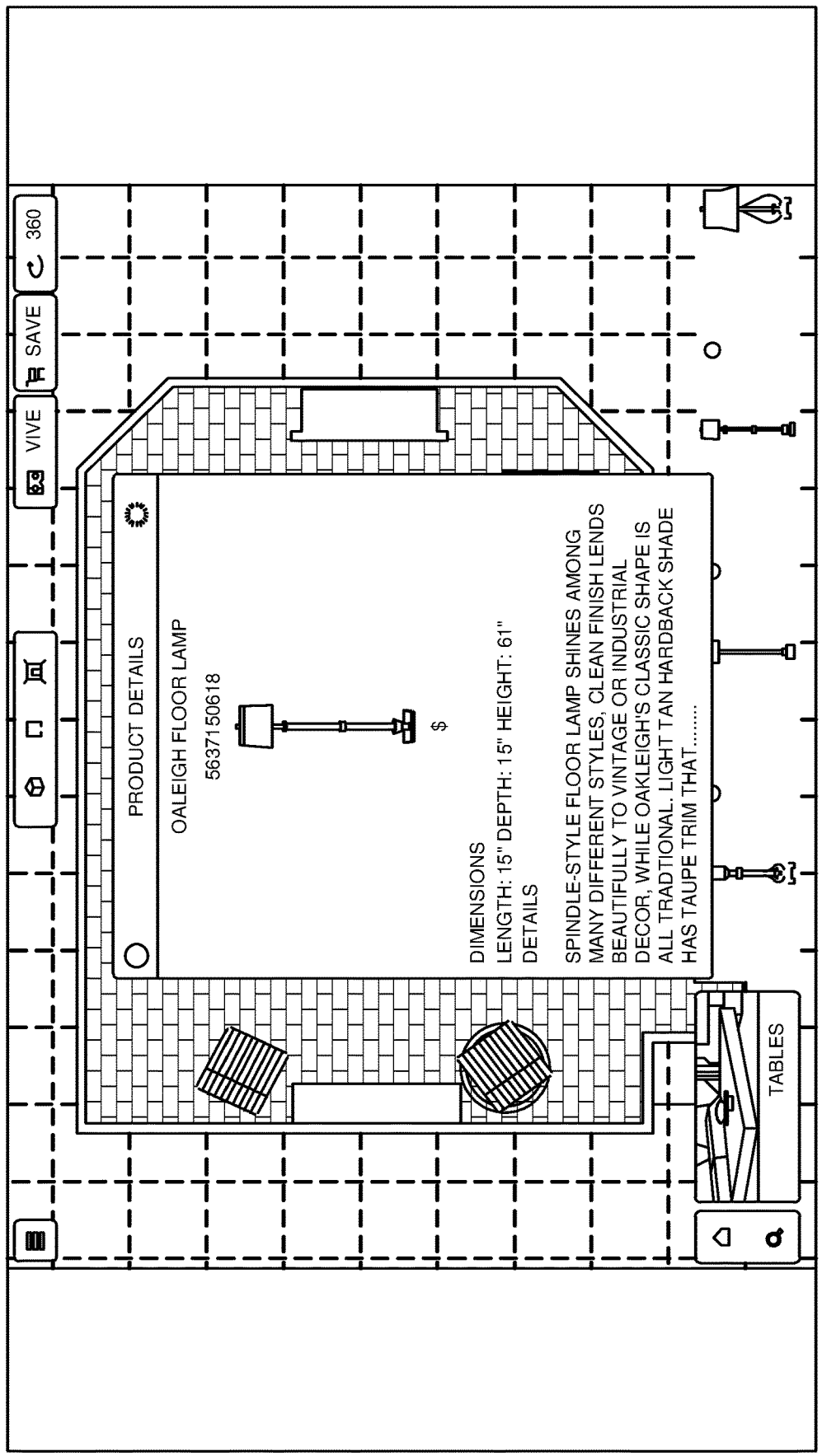
FIG. 20 shows an example technique of a technology for composing a virtual reality setting in a mobile computing device environment according to the present disclosure.

As shown in FIG. 12 to FIG. 20, the user may rotate the objects about the z-axis in order to place the objects in a desired position within the virtual environment of interest. As illustrated in FIG. 18 and/or FIG. 19, perhaps for example when one or more, or each, furniture object is active, a range of options may be available for that object. For example, as shown in FIG. 20, detailed information about the furniture object may be retrieved through system 100 and/or mobile computing device 102. As shown in FIG. 18 and/or FIG. 19, a dollar sign icon may be available. Selecting the dollar sign icon may activate an electronic commerce interface (not shown), permitting the user to purchase the furniture objects shown in the rendered virtual environment of interest.

Figure 21:
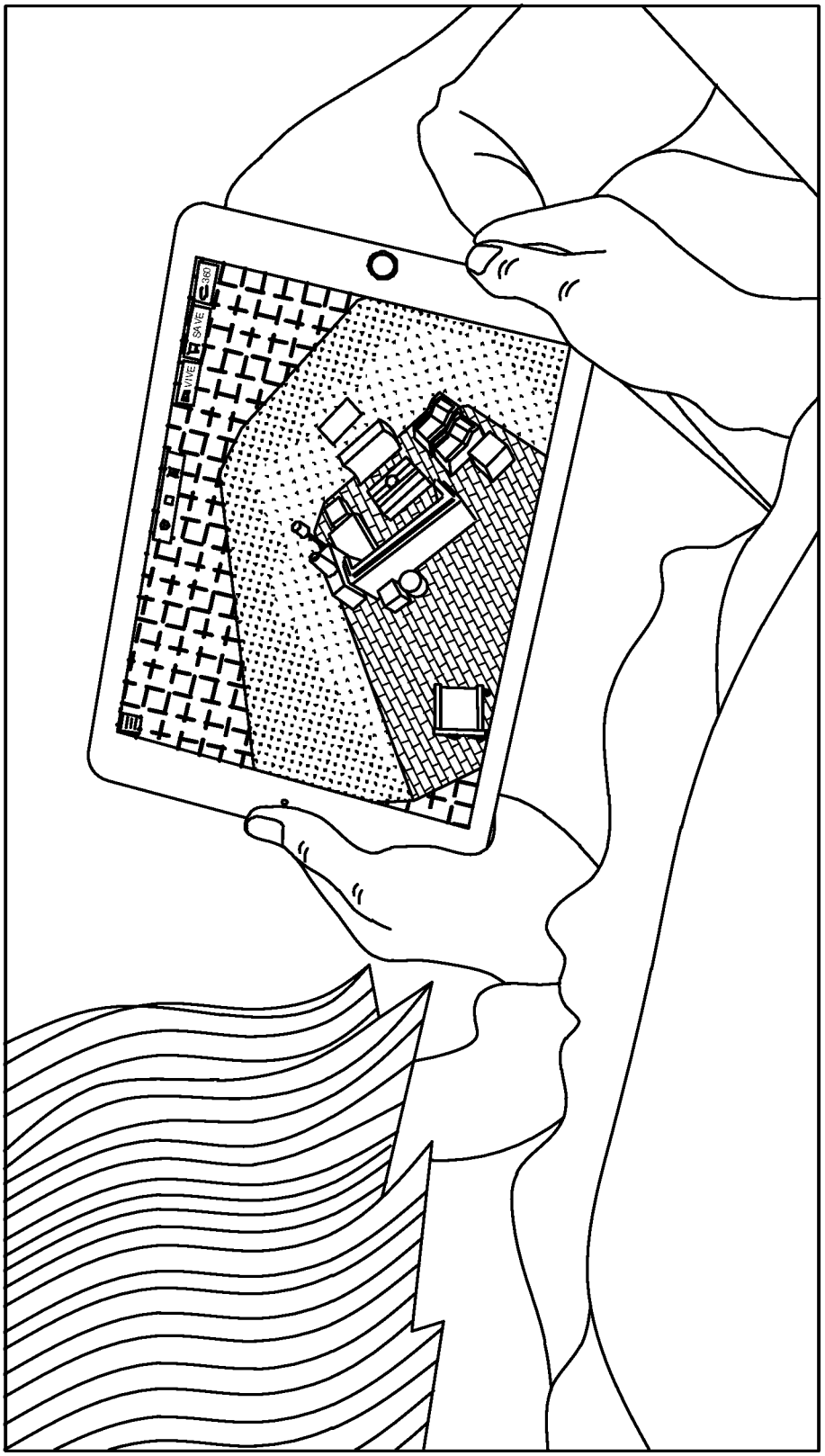
FIG. 21 shows an example technique of a technology for composing a virtual reality setting in a mobile computing device environment according to the present disclosure.
Figure 22:
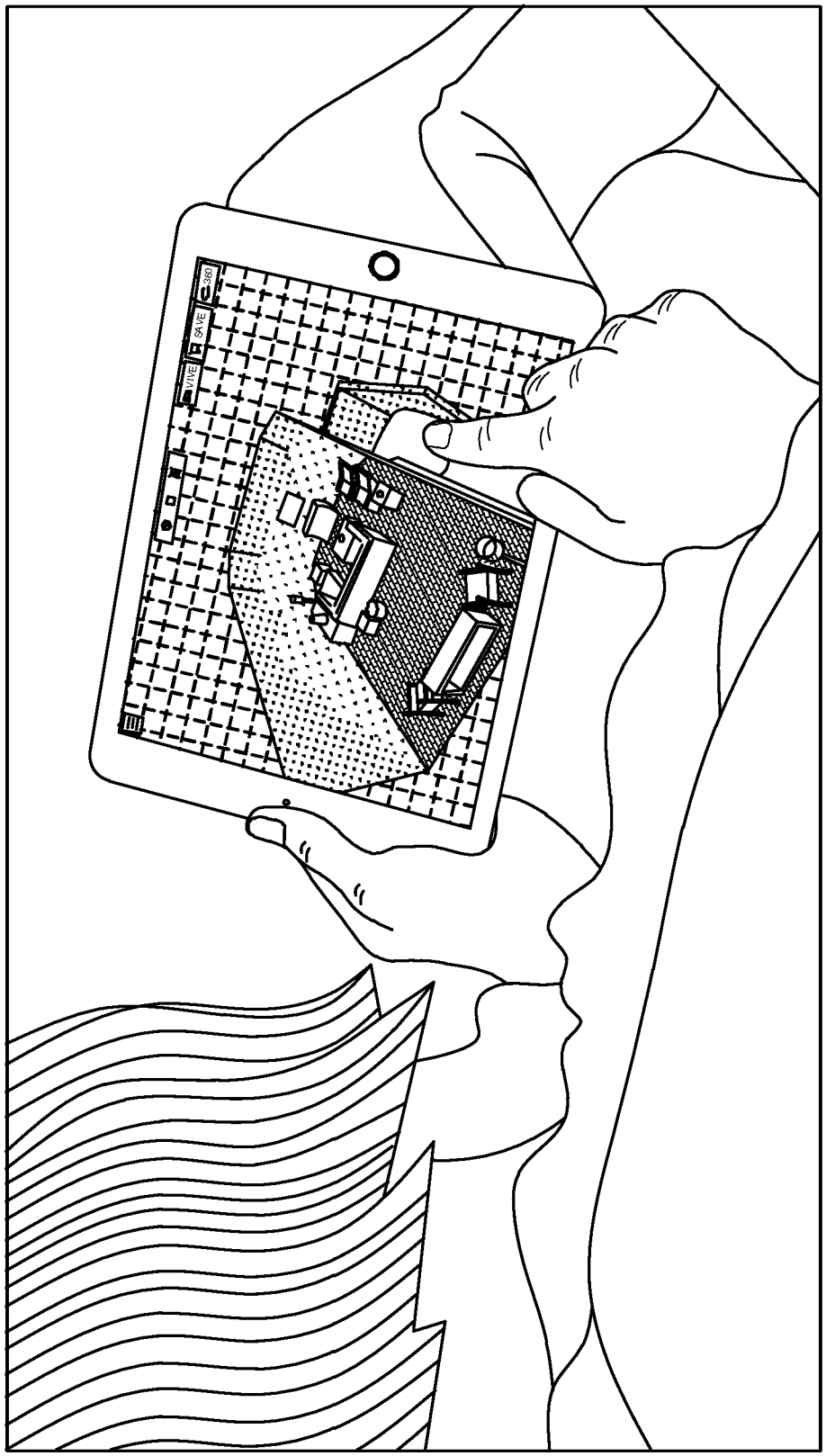
FIG. 22 shows an example technique of a technology for composing a virtual reality setting in a mobile computing device environment according to the present disclosure.
Figure 23:
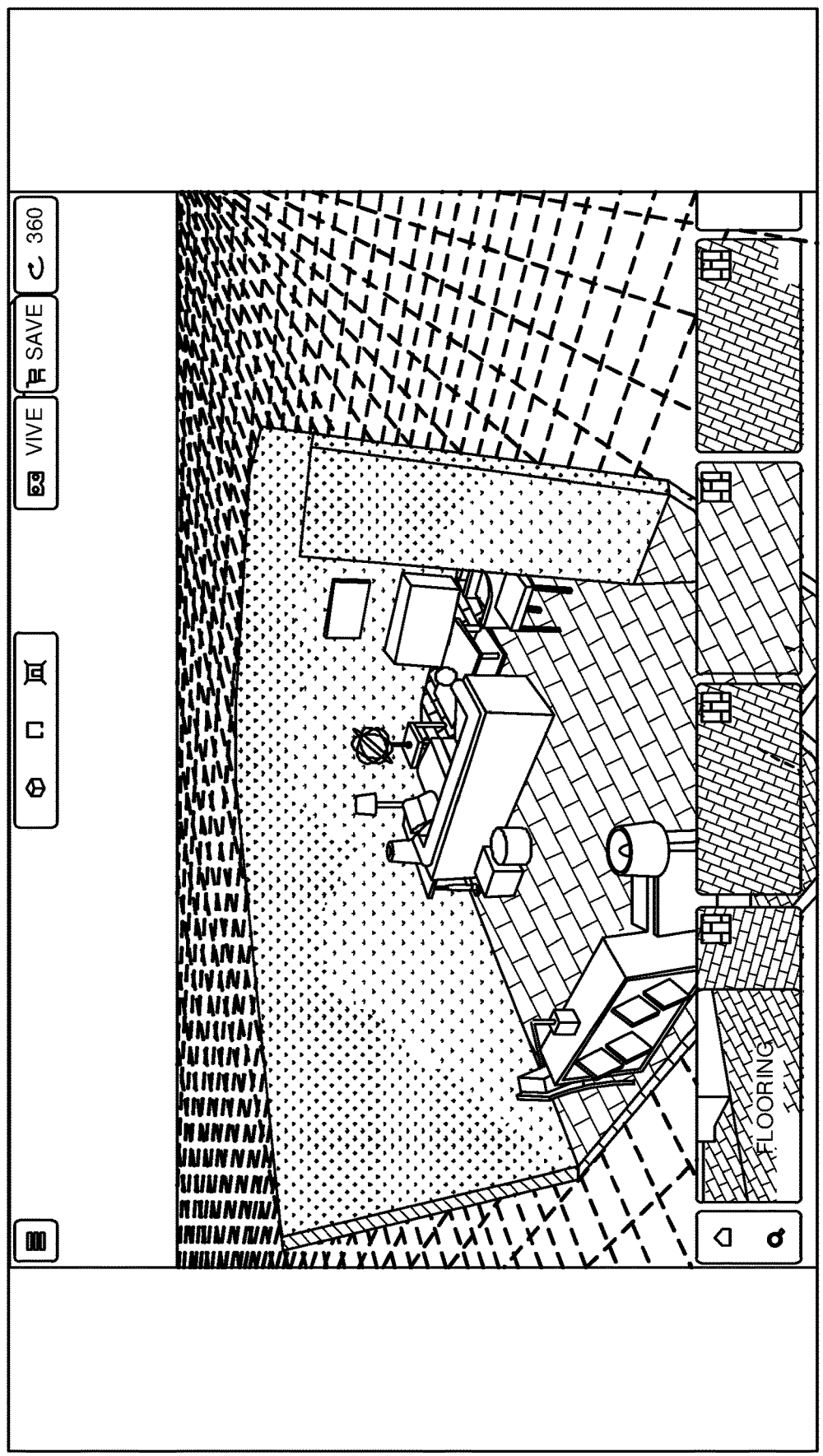
FIG. 23 shows an example technique of a technology for composing a virtual reality setting in a mobile computing device environment according to the present disclosure.
Figure 24:
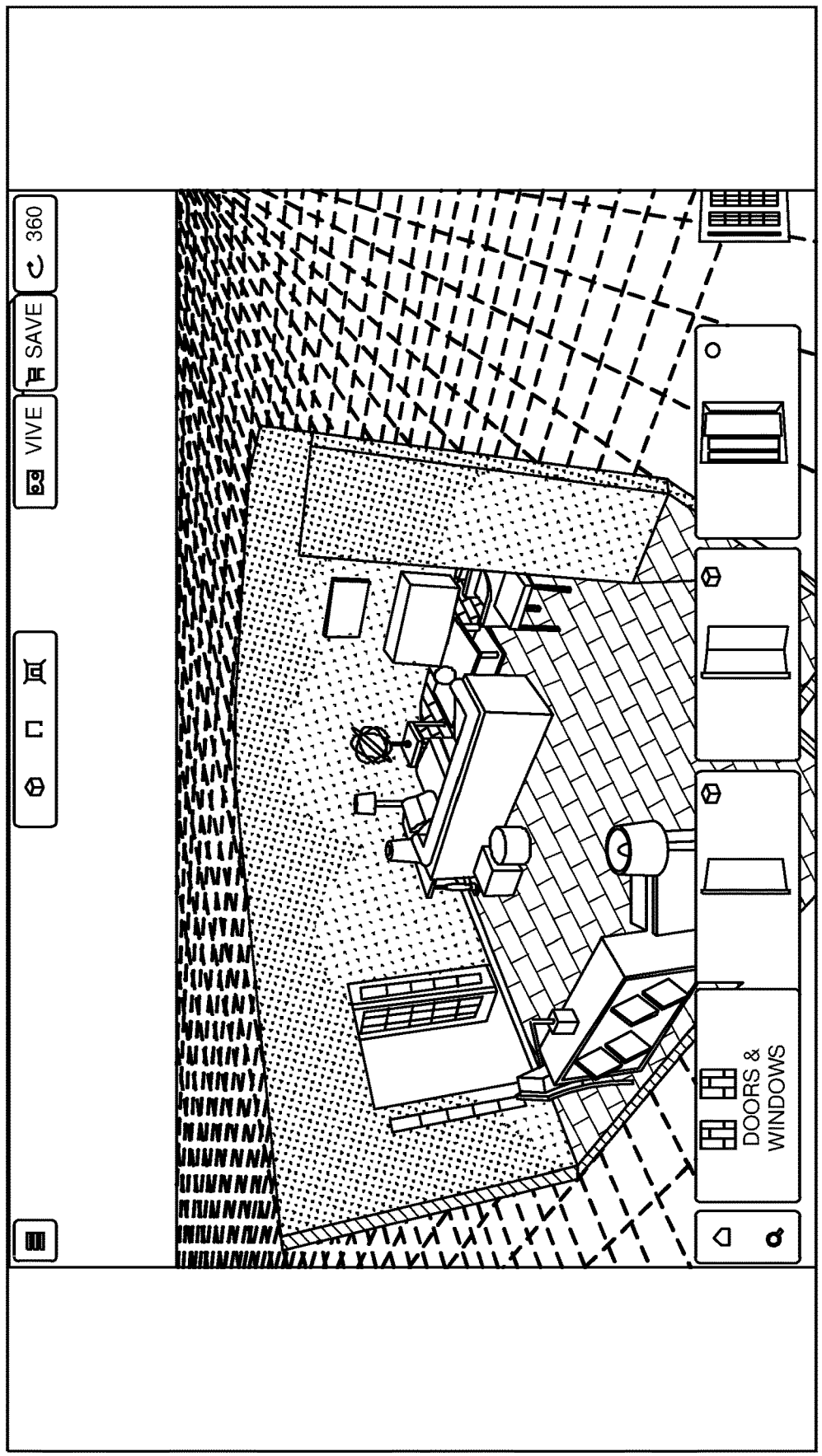
FIG. 24 shows an example technique of a technology for composing a virtual reality setting in a mobile computing device environment according to the present disclosure.
Figure 25:
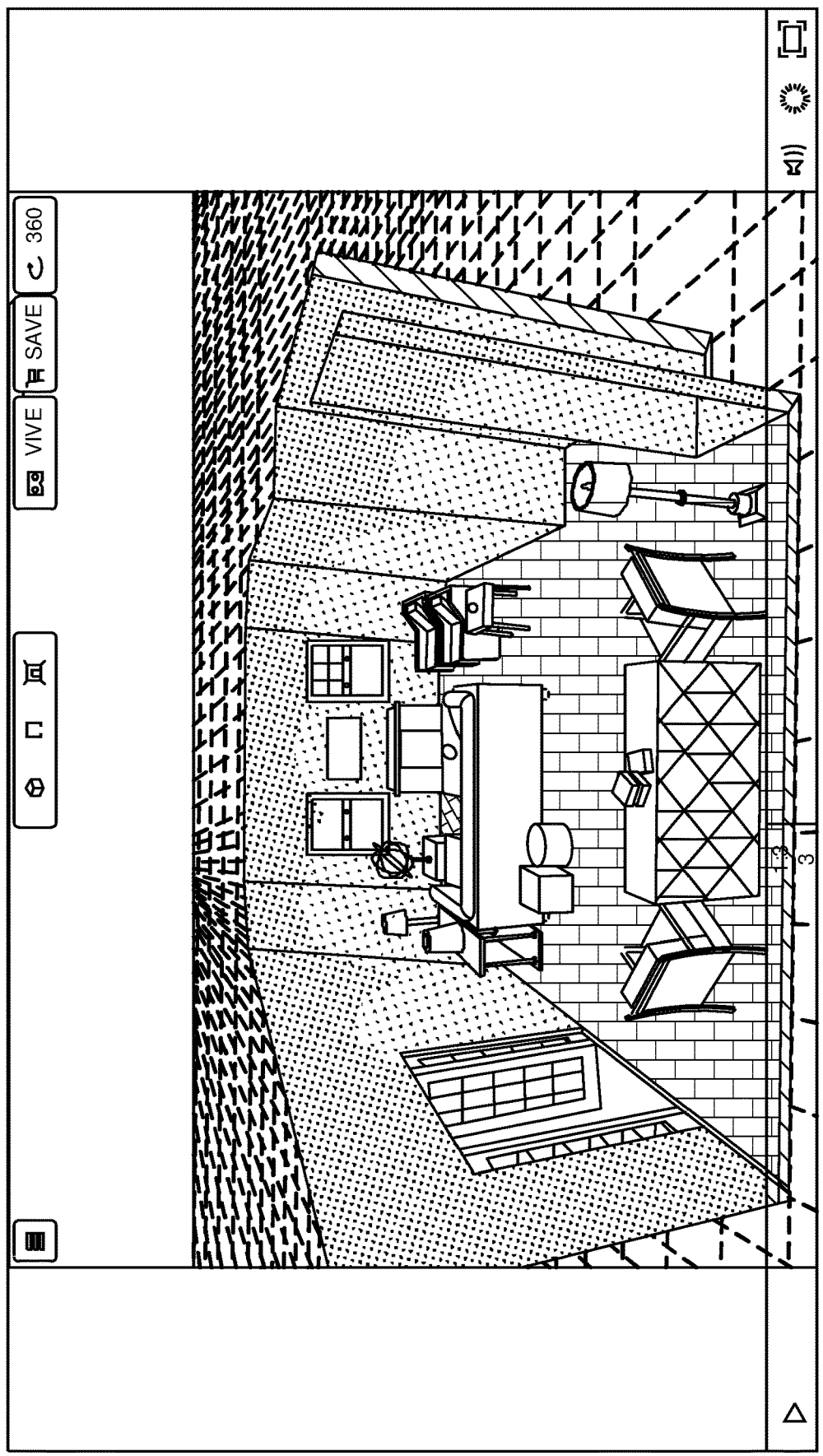
FIG. 25 shows an example technique of a technology for composing a virtual reality setting in a mobile computing device environment according to the present disclosure.
Figure 26:
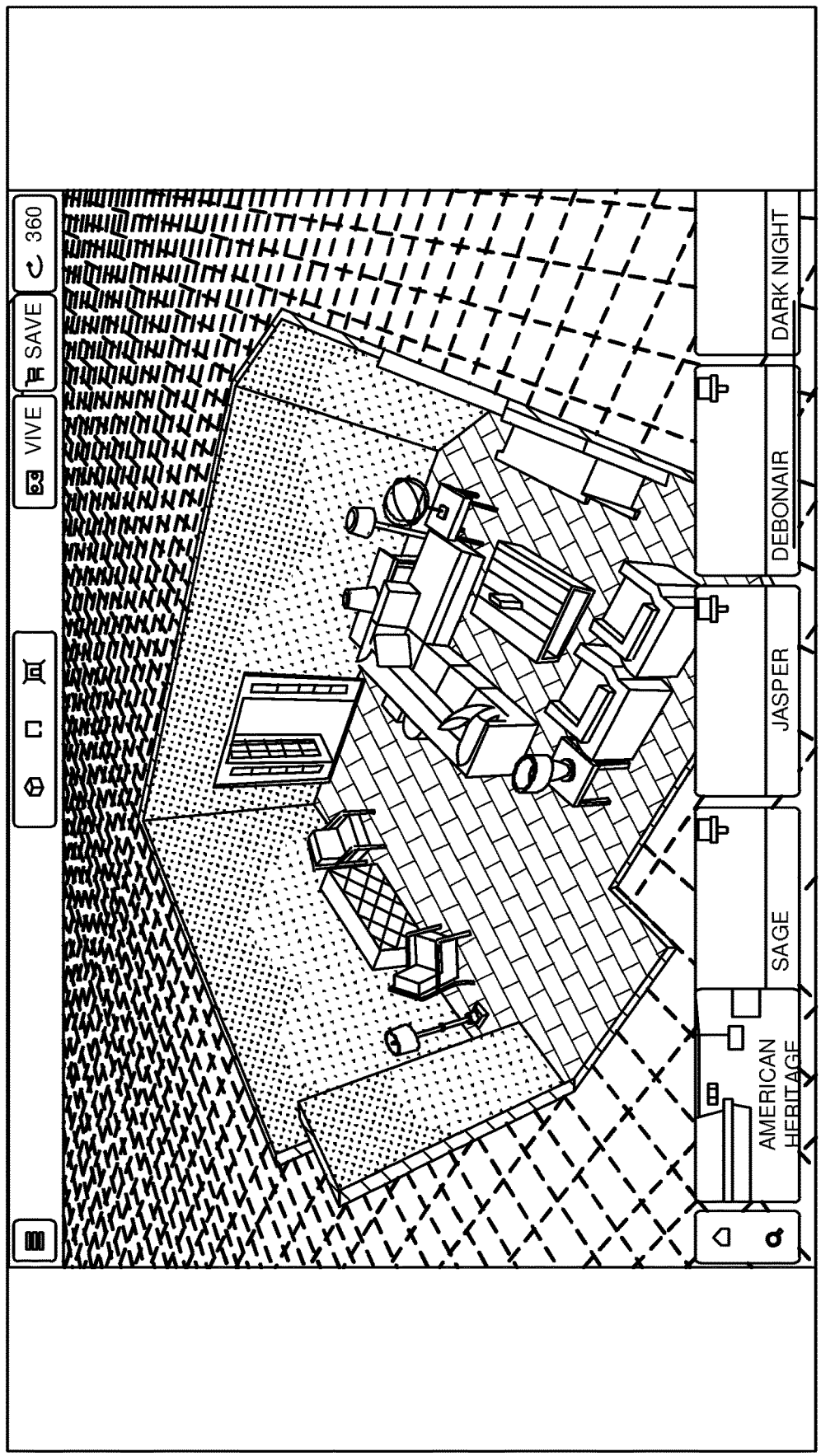
FIG. 26 shows an example technique of a technology for composing a virtual reality setting in a mobile computing device environment according to the present disclosure.
Figure 27:
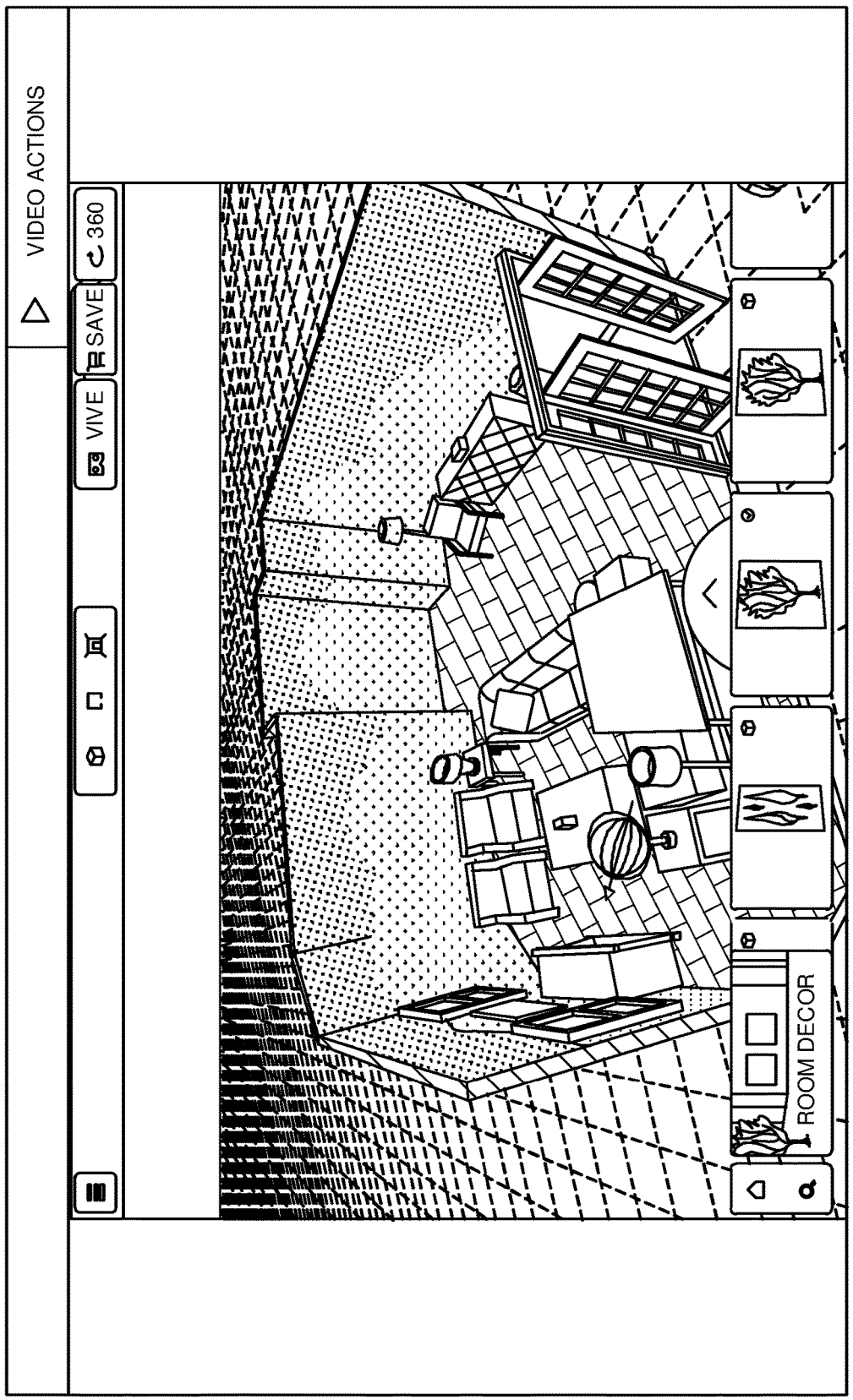
FIG. 27 shows an example technique of a technology for composing a virtual reality setting in a mobile computing device environment according to the present disclosure.

As shown in FIG. 21 and/or FIG. 22, the user, through interaction with display 210, can rotate the fully rendered virtual environment of interest around one or more, or all three, axes. As shown in FIG. 23 to FIG. 25, the user may install different flooring object, door objects, and/or window objects in the rendered virtual environment of interest. As shown in FIG. 26 and/or FIG. 27, the user can again rotate the rendered virtual environment of interest in order to view the layout from different perspectives.

Augmented reality blends a user's environment with digital information (e.g., virtual objects), generally in real time. In other words, the digital information may be embedded, and/or may overlay, the actual environment. Image recognition software may analyze environment information as detected from one or more images of the environment, and/or a location of the mobile computing device that captured the image relative to the environment at the time at which the respective images were taken, and/or may render realistic virtual objects in the environment. Because it can be difficult to anticipate the movement of the mobile computing device 102 relative to the environment in advance, the virtual objects may be rendered in real-time. One or more techniques performed by system 100 and/or mobile computing device 102 as disclosed herein may be adapted for augmented reality.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for composing a virtual reality setting in a mobile computing device, the method comprising:
configuring a virtual reality environment on the mobile computing device;
selecting at least one virtual item for addition to the virtual reality environment;
determining information regarding at least one of: a fit, a location, or a compatibility of the at least one virtual item relative to the virtual reality environment, the information comprising at least one of: one or more rules regarding the at least one virtual item, or metadata corresponding to the at least one virtual item, the information controlling an addition of the at least one virtual item to the virtual reality environment such that the at least one virtual item is to be in virtual contact with at least a second virtual object according to one or more merchandising characteristics;
adding the at least one virtual item to the virtual reality environment based, at least in part, on the information; and
rendering the virtual reality environment on a display of the mobile computing device.

2. The method of claim 1, wherein the one or more rules regarding the at least one virtual item are at least one of: predetermined, or determined by the mobile computing device at run time, and wherein the metadata corresponding to the at least one virtual item is at least one of: predetermined, or determined by the mobile computing device at run time.

3. The method of claim 1, further comprising:
obtaining, at run time, at least one of: the metadata corresponding to the at least one virtual item, or the one or more rules regarding the at least one virtual item.

4. The method of claim 3, wherein the obtaining includes:
receiving at least one of: the metadata corresponding to the at least one virtual item, or the one or more rules regarding the at least one virtual item, from a database, the database being at least one of: stored in a memory of the mobile computing device, or located at a remote computing device in communication with the mobile computing device.

5. The method of claim 1, wherein the at least one virtual item is at least one of: a virtual object, or a virtual assembly.

6. The method of claim 5, wherein the virtual object is at least one of: a cabinet, a refrigerator, a sofa, a floor, a table, a dishwasher, a faucet, a vanity, or a lamp, and the virtual assembly is at least one of: a plurality of kitchen cabinets, a faucet mounted on a vanity, or a lamp on a table.

7. The method of claim 5, wherein the at least one of: the one or more rules regarding the at least one virtual item, or the metadata corresponding to the at least one virtual item, corresponds, at least in part, to a virtual object class.

8. The method of claim 7, wherein the at least one virtual item is a first virtual object of a first virtual object class, and the at least one of: the one or more rules regarding the at least one virtual item, or the metadata corresponding to the at least one virtual item, controls the adding of the first virtual object to the virtual reality environment such that the first virtual object is to be in virtual contact with a second virtual object of the first virtual object class.

9. The method of claim 5, wherein the at least one virtual item is a first virtual object, and the at least one of: the one or more rules regarding the at least one virtual item, or the metadata corresponding to the at least one virtual item, controls the adding of the first virtual object to the virtual reality environment such that the first virtual object is to be in virtual contact with one or more specific other virtual objects.

10. The method of claim 1, wherein the configuring the virtual reality environment includes:
capturing an image via a camera of the mobile computing device;
analyzing the captured image; and
rendering the analyzed captured image into at least a part of the virtual reality environment.

11. The method of claim 1, wherein the configuring the virtual reality environment includes:
obtaining at least one of: a two-dimensional (2D) model, or a three-dimensional (3D) model; and
rendering the at least one of: the 2D model, or the 3D model into at least a part of the virtual reality environment.

12. The method of claim 11, wherein the obtaining includes:
receiving the at least one of: the 2D model, or the 3D model from a database, the database being at least one of: stored in a memory of the mobile computing device, or located at a remote computing device in communication with the mobile computing device.

13. The method of claim 1, wherein the one or more merchandising characteristics include one or more of: a sale discount for the second virtual object, a manufacturer's rebate for the second virtual object, a warranty of use of the second virtual object in combination with the at least one virtual item, or a physical interconnection capability between the at least one virtual item and the second virtual object.

14. A mobile computing device, comprising:
a memory;
a display; and
a processor, the processor configured at least to:
configure a virtual reality environment on the mobile computing device;
select at least one virtual item for addition to the virtual reality environment;
determine information regarding at least one of: a fit, a location, or a compatibility of the at least one virtual item relative to the virtual reality environment, the information comprising at least one of: one or more rules regarding the at least one virtual item, or metadata corresponding to the at least one virtual item, the information controlling an addition of the at least one virtual item to the virtual reality environment such that the at least one virtual item is to be in virtual contact with at least a second virtual object according to one or more merchandising characteristics;
add the at least one virtual item to the virtual reality environment based, at least in part, in the information; and
render the virtual reality environment on the display.

15. The device of claim 14, wherein the processor is further configured such that:
the information comprises at least one of: one or more rules regarding the at least one virtual item, or metadata corresponding to the at least one virtual item;
the one or more rules regarding the at least one virtual item are at least one of: predetermined, or determined by the mobile computing device at run time; and
the metadata corresponding to the at least one virtual item is at least one of: predetermined, or determined by the mobile computing device at run time.

16. The device of claim 15, wherein the processor is further configured to:
receive at least one of: the metadata corresponding to the at least one virtual item, or the one or more rules regarding the at least one virtual item, from a database, the database being at least one of: stored in a memory of the mobile computing device, or located at a remote computing device in communication with the mobile computing device.

17. The device of claim 14, wherein the processor is further configured such that one or more merchandising characteristics include one or more of: a sale discount for the second virtual object, a manufacturer's rebate for the second virtual object, a warranty of use of the second virtual object in combination with the at least one virtual item, or a physical interconnection capability between the at least one virtual item and the second virtual object.

18. The device of claim 14, wherein the processor is further configured such that the at least one virtual item is at least one of: a virtual object, or a virtual assembly.

19. The device of claim 18, wherein the processor is further configured such that the virtual object is at least one of: a cabinet, a refrigerator, a sofa, a floor, a table, a dishwasher, a faucet, a vanity, or a lamp, and the virtual assembly is at least one of: a plurality of kitchen cabinets, a faucet mounted on a vanity, or a lamp on a table.

20. The device of claim 14, wherein the processor is further configured to obtain, at run time, at least one of: the metadata corresponding to the at least one virtual item, or the one or more rules regarding the at least one virtual item.

21. The device of claim 14, wherein the processor is further configured to:
obtain at least one of: a two-dimensional (2D) model, or a three-dimensional (3D) model; and
render the at least one of: the 2D model, or the 3D model into at least a part of the virtual reality environment.

22. The device of claim 14, wherein the at least one of: the one or more rules regarding the at least one virtual item, or the metadata corresponding to the at least one virtual item, corresponds, at least in part, to a virtual object class, the at least one virtual item is a first virtual object of a first virtual object class, and the at least one of: the one or more rules regarding the at least one virtual item, or the metadata corresponding to the at least one virtual item, controls the adding of the first virtual object to the virtual reality environment such that the first virtual object is to be in virtual contact with a second virtual object of the first virtual object class.

* * * * *